US011036050B2

(12) United States Patent
Liu et al.

(10) Patent No.: US 11,036,050 B2
(45) Date of Patent: Jun. 15, 2021

(54) WEARABLE APPARATUS AND UNMANNED AERIAL VEHICLE SYSTEM

(71) Applicant: SZ DJI TECHNOLOGY CO., LTD., Shenzhen (CN)

(72) Inventors: Huaiyu Liu, Shenzhen (CN); Ming Gong, Shenzhen (CN); Mengyao Jiang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 254 days.

(21) Appl. No.: 16/053,105

(22) Filed: Aug. 2, 2018

(65) Prior Publication Data

US 2018/0373040 A1 Dec. 27, 2018

Related U.S. Application Data

(63) Continuation of application No. PCT/CN2016/080779, filed on Apr. 29, 2016.

(51) Int. Cl.
*G02B 27/01* (2006.01)

(52) U.S. Cl.
CPC ......... *G02B 27/0172* (2013.01); *G02B 27/01* (2013.01); *G02B 27/0101* (2013.01);
(Continued)

(58) Field of Classification Search
CPC combination set(s) only.
See application file for complete search history.

(56) References Cited

U.S. PATENT DOCUMENTS

2013/0083404 A1\* 4/2013 Takagi ............... G02B 27/0172
359/633
2013/0141434 A1 6/2013 Sugden et al.
(Continued)

FOREIGN PATENT DOCUMENTS

CN 1664649 A 9/2005
CN 101029968 A 9/2007
(Continued)

OTHER PUBLICATIONS

The World Intellectual Property Organization (WIPO) International Search Report for PCT/CN2016/080779 dated Feb. 4, 2017 10 Pages (including translation).

*Primary Examiner* — William Boddie
*Assistant Examiner* — Alecia D English
(74) *Attorney, Agent, or Firm* — Anova Law Group, PLLC

(57) ABSTRACT

A wearable apparatus includes a first display screen having a first display plane, a second display screen having a second display plane, a first optical mirror including a first reflective surface facing the first display screen, a second optical mirror including a second reflective surface facing the second display screen, a first eyepiece arranged between the first display screen and the first optical mirror, and a second eyepiece arranged between the second display screen and the second optical mirror. An optical axis of the first eyepiece is approximately parallel to the first display plane. An optical axis of the second eyepiece is approximately parallel to the second display plane. The first reflective surface and the first display screen form a first predetermined angle. The second reflective surface and the second display screen form a second predetermined angle.

17 Claims, 4 Drawing Sheets

(52) U.S. Cl.
CPC .. *G02B 27/0179* (2013.01); *G02B 2027/0123* (2013.01); *G02B 2027/0183* (2013.01)

(56) References Cited

U.S. PATENT DOCUMENTS

| | | | |
|---|---|---|---|
| 2013/0234915 A1* | 9/2013 | Takeda | G02B 27/0172 345/8 |
| 2015/0323788 A1* | 11/2015 | Zou | G02B 27/017 359/630 |
| 2016/0041394 A1* | 2/2016 | Tanaka | G02B 27/0172 359/630 |
| 2017/0123209 A1* | 5/2017 | Spitzer | G02B 27/0172 |
| 2017/0171531 A1* | 6/2017 | Xie | H04N 13/363 |
| 2017/0219826 A1* | 8/2017 | Haseltine | G02B 27/283 |
| 2017/0243406 A1* | 8/2017 | Yamazaki | G09G 3/002 |

FOREIGN PATENT DOCUMENTS

| | | |
|---|---|---|
| CN | 102906623 A | 1/2013 |
| CN | 203480126 U | 3/2014 |
| CN | 203786396 U | 8/2014 |
| CN | 104216841 A | 12/2014 |
| CN | 203981975 U | 12/2014 |
| CN | 204101817 U | 1/2015 |
| CN | 104898276 A | 9/2015 |
| CN | 204613516 U | 9/2015 |
| CN | 204679715 U | 9/2015 |
| CN | 105094304 A | 11/2015 |
| CN | 204855937 U | 12/2015 |
| CN | 205015835 U | 2/2016 |
| WO | 2015123775 A1 | 8/2015 |

* cited by examiner

WEARABLE APPARATUS AND UNMANNED AERIAL VEHICLE SYSTEM

CROSS-REFERENCE TO RELATED APPLICATION

This application is a continuation application of International Application No. PCT/CN2016/080779, filed on Apr. 29, 2016, the entire contents of which are incorporated in the present disclosure by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to virtual reality technology and, more particularly, to a wearable apparatus and an unmanned aerial vehicle system.

BACKGROUND

With the development of science and technology, glasses or helmet products become more and more popular in the fields of, e.g., video and audio playing, video games, and unmanned aerial vehicle (UAV) flying with first-person-view. These products can be divided into two categories, virtual reality and augmented reality, based on principle and user experience. Virtual reality is a computer technology that comprehensively utilizes computer graphic system in combination with a variety of interface devices such as display and controller, to generate realistic images, sounds, and other sensations that simulate a user's physical presence in a virtual or imaginary environment. Representative products include Oculus Rift and Sony Morpheus. Augmented reality is a new technology developed on the basis of virtual reality, which aims to enhance user's perception of the real world with supplemental information generated by a computer system. Augmented reality overlays virtual objects, fields, or system messages created by the computer system in the real environment to "augment" the real world sensory. Representative products include Google Glasses and Microsoft Hololens.

Most virtual reality glasses on the market use a single display screen, with the left half of the screen showing an image to be viewed by the left eye of a user and the right half of the screen showing an image to be viewed by the right eye of the user. The two images are magnified by a set of lenses to further improve the field of view and achieve virtual reality experience.

In the above existing technologies, the screen is placed in front of the user's eyes. Due to the limitation of interpupillary distance of human eyes (normally, the interpupillary distance of a person ranges from about 55 mm to about 75 mm), the screen size is restricted and the common size is approximately 5.5 inches. However, currently a 5.5-inch screen has a maximum resolution of 2560×1440. If the screen is divided into left and right portions and each portion needs to maintain an aspect ratio of 16:9, the effective display area for a single eye is only 2.7 inches with a resolution of 1280×720. Because the effective display area is small, the lens sets need to have a relatively high magnification to improve the sense of immersion. However, the high magnification results in a strong grain effect and hence a poor display quality.

SUMMARY

In accordance with the disclosure, there is provided a wearable apparatus including a first display screen having a first display plane, a second display screen having a second display plane, a first optical mirror including a first reflective surface facing the first display screen, a second optical mirror including a second reflective surface facing the second display screen, a first eyepiece arranged between the first display screen and the first optical mirror, and a second eyepiece arranged between the second display screen and the second optical mirror. An optical axis of the first eyepiece is approximately parallel to the first display plane. An optical axis of the second eyepiece is approximately parallel to the second display plane. The first reflective surface and the first display screen form a first predetermined angle, such that an object image projected by the first display screen through the first optical mirror is approximately perpendicular to the optical axis of the first eyepiece. The second reflective surface and the second display screen form a second predetermined angle, such that an object image projected by the second display screen through the second optical mirror is approximately perpendicular to the optical axis of the second eyepiece.

Also in accordance with the disclosure, there is provided an unmanned aerial vehicle system includes a camera and a wearable apparatus coupled in communication with the camera. The wearable apparatus including a first display screen having a first display plane, a second display screen having a second display plane, a first optical mirror including a first reflective surface facing the first display screen, a second optical mirror including a second reflective surface facing the second display screen, a first eyepiece arranged between the first display screen and the first optical mirror, and a second eyepiece arranged between the second display screen and the second optical mirror. An optical axis of the first eyepiece is approximately parallel to the first display plane. An optical axis of the second eyepiece is approximately parallel to the second display plane. The first reflective surface and the first display screen form a first predetermined angle, such that an object image projected by the first display screen through the first optical mirror is approximately perpendicular to the optical axis of the first eyepiece. The second reflective surface and the second display screen form a second predetermined angle, such that an object image projected by the second display screen through the second optical mirror is approximately perpendicular to the optical axis of the second eyepiece.

DETAILED DESCRIPTION OF THE EMBODIMENTS

In order to make the objects, technical solutions, and advantages of the disclosure more apparent, the technical solutions in the embodiments of the disclosure will be described below in more detail with reference to the drawings, and apparently the embodiments as described are merely some but not all of the embodiments of the disclosure. All other embodiments that can occur to those ordinarily skilled in the art from the disclosed embodiments here without any inventive effort shall fall into the scope of the disclosure.

As used in the present disclosure, when a first component is referred to as "fixed to" a second component, it is intended that the first component may be directly attached to the second component or may be indirectly attached to the second component via another component. When a first component is referred to as "connecting" to a second component, it is intended that the first component may be directly connected to the second component or may be indirectly connected to the second component via a third component between them.

In the description of the present disclosure, it should be understood that the terms "first,", "second," etc. are only used to indicate different components, but do not indicate or imply the order, the relative importance, or the number of the components. Thus, the term "first," or "second" preceding a feature explicitly or implicitly indicates one or more of such feature.

Unless otherwise defined, all the technical and scientific terms used in the present disclosure have the same or similar meanings as generally understood by one of ordinary skill in the art. As described in the present disclosure, the terms used in the specification of the present disclosure are intended to describe example embodiments, instead of limiting the present disclosure. The term "and/or" used in the present disclosure includes any suitable combination of one or more related items listed.

Example embodiments will be described with reference to the accompanying drawings, in which the same numbers refer to the same or similar elements unless otherwise specified.

Figure 1:
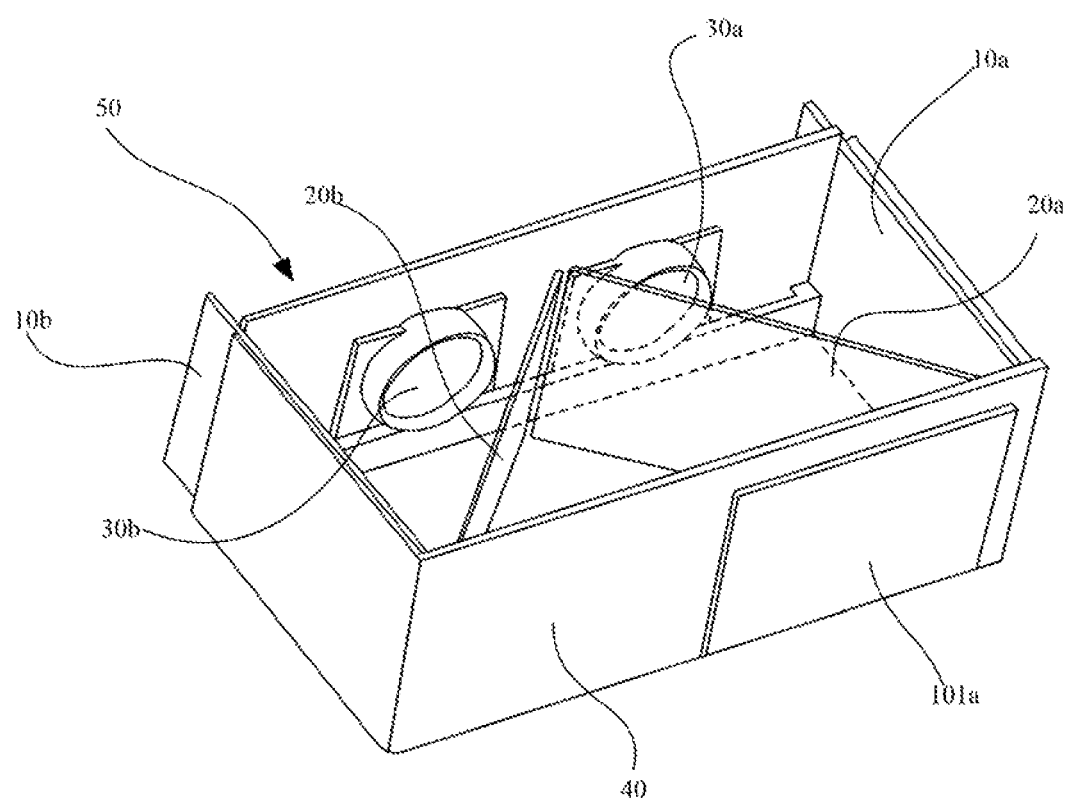
FIG. 1 is a schematic structural diagram of a wearable apparatus according to an example embodiment.
Figure 2:
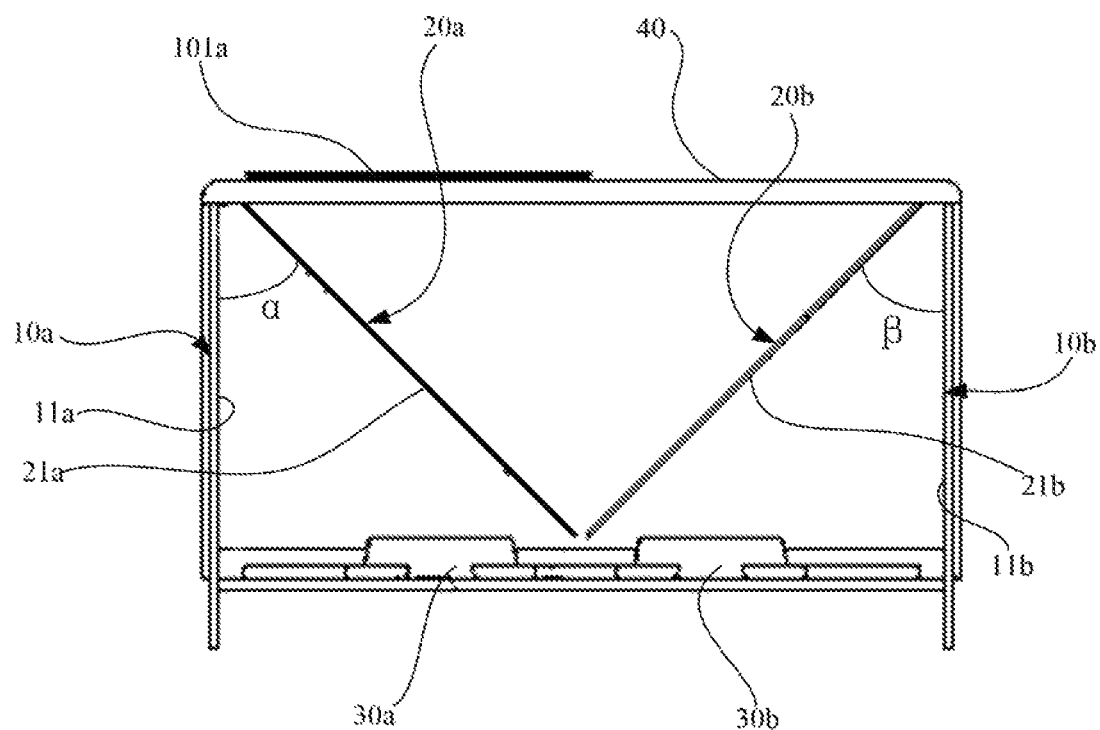
FIG. 2 is a top view of the wearable apparatus in FIG. 1.

FIG. 1 is a schematic structural diagram of a wearable apparatus according to an example embodiment. FIG. 2 is a top view of the wearable apparatus in FIG. 1. As shown in FIGS. 1 and 2, the wearable apparatus includes a first display screen 10a, a second display screen 10b, a first optical mirror 20a, a second optical mirror 20b, a first eyepiece 30a positioned between the first display screen 10a and the first optical mirror 20a, and a second eyepiece 30b positioned between the second display screen 10b and the second optical mirror 20b.

As shown in FIG. 2, the display plane 11a of the first display screen 10a is parallel to the optical axis of the first eyepiece 30a, and the display plane 11b of the second display screen 10b is parallel to the optical axis of the second eyepiece 30b.

Two reflective surfaces 21a and 21b are formed on the first optical mirror 20a and the second optical mirror 20b, respectively. The reflective surface 21a of the first optical mirror 20a faces the first display screen 10a and a first predetermined angle α is formed between the reflective surface 21a of the first optical mirror 20a and the first display screen 10a, such that an object image 101a projected by the first display screen 10a via the first optical mirror 20a is approximately perpendicular to the optical axis of the first eyepiece 30a. The reflective surface 21b of the second optical mirror 20b faces the second display screen 10b and a second predetermined angle β is formed between the reflective surface 21b of the second optical mirror 20b and the second display screen 10b. As a result, the object image (not shown) projected by the second display screen 10b via the second optical mirror 20b can be approximately perpendicular to the optical axis of the second eyepiece 30b.

In some embodiments, the reflective surface 21a of the first optical mirror 20a and the reflective surface 21b of the second optical mirror 20b may be coated with a reflective film or a semi-transmissive/semi-reflective film. For example, when the first optical mirror 20a and the second optical mirror 20b only need to reflect light, each of the reflective surfaces 21a, 21b may be coated with a reflective film. When the first optical mirror 20a and the second optical mirror 20b need to both reflect and transmit light, each of the reflective surface 21a of the first optical mirror 20a and the reflective surface 21b of the second optical mirror 20b may be coated with a semi-transmissive/semi-reflective film. For example, if the wearable apparatus is an augmented reality apparatus, the first optical mirror 20a and the second optical mirror 20b may need to be partially transmissive and partially reflective, and thus, the reflective surface 21a of the first optical mirror 20a and the reflective surface 21b of the second optical mirror 20b may each be coated with a semi-transmissive/semi-reflective film.

Persons skilled in the art would understand that in an optical system, the eyepiece is generally an optical element for magnifying an image produced by an objective lens. Thus, the images viewed by a user through the first eyepiece 30a and the second eyepiece 30b may be magnified. In some embodiments, both the first eyepiece 30a and the second eyepiece 30b may include a lens set including at least one convex lens and at least one concave lens. The convex lens may further magnify the image, widen the field of view, and enhance the sense of immersion. The concave lens may limit the field of view and allow a certain range of light to pass through the lens set.

The first display screen 10a and the second display screen 10b may include monitors having a display function. The physical shape and structure thereof may not be limited. For example, each of the first display screen 10a and the second display screen 10b may include a liquid crystal display (LCD). In some other embodiments, each of the first display screen 10a and the second display screen 10b may include an organic light-emitting diode (OLED) display. The first display screen 10a and the second display screen 10b may be of a type other than LCD and OLED. In some embodiments, the first display screen 10a and the second display screen 10b may be of different types. The images displayed on the first display screen 10a and the second display screen 10b may be reflected by the first optical mirror 20a and the second optical mirror 20b, respectively, into the user's eyes, thus allowing the user to see the contents presented on the first display screen 10a and the second display screen 10b. For example, the contents on the first display screen 10a may be viewed by the left eye of the user, while the contents on the second display screen 10b may be viewed by the right eye. The sensation of 3D may be generated due to binocular parallax.

When using the wearable apparatus, the user can look through the first eyepiece 30a with the user's left eye, and can look through the second eyepiece 30b with the user's right eye. The display plane 11a of the first display screen 10a may be parallel to the optical axis of the first eyepiece 30a, and hence may be parallel to the optical axis of the user's left eye. The display plane 11b of the second display screen 10b may be parallel to the optical axis of the second eyepiece 30b, and hence may be parallel to the optical axis of user's right eye. The first predetermined angle α may be formed between the reflective surface 21a of the first optical mirror 20a and the first display screen 10a. The second predetermined angle β may be formed between the reflective surface 21b of the second optical mirror 20b and the second display screen 10b. The values of the first predetermined angle α and the second predetermined angle β may be set according to the actual needs, which are not limited here. Consistent with the disclosure, however, the first predetermined angle α can be set to ensure that the object image projected by the first display screen 10a via the first optical mirror 20a is approximately perpendicular to the optical axis of the first eyepiece 30a. Similarly, the second predetermined angle β can be set to ensure that the object image projected by the second display screen 10b via the second optical mirror 20b is approximately perpendicular to the optical axis of the second eyepiece 30b. As a result, the distances between various points on the object image and the eyepiece can be the same, thereby preventing the object images from deforming into trapezoids to deteriorate viewing effect.

In some embodiments, each of the first eyepiece 30a and the second eyepiece 30b may include a lens set including at least one convex lens and at least one concave lens. Thus, the object images, formed by reflection of the contents displayed on the first display screen 10a and the second display 10b by the first optical mirror 20a and the second optical mirror 20b, may be virtual images.

The wearable apparatus can be, e.g., eyeglasses or a helmet, which is not limited in the present disclosure. Consistent with the disclosure, the wearable apparatus may display contents using two display screens (the first display screen 10a and the second display screen 10b), and may project the displayed contents into the user's left and right eyes via the first optical mirror 20a and the second optical mirror 20b. Compared to the existing technologies, the effective monocular visual field consistent with the disclosure can reach 5.5 inches, with a resolution of 2560×1440. The field of view can reach approximately 45° without eyepieces disposed in the wearable apparatus. If eyepieces with a 1.5-time magnification are added, the field of view can further reach 70°. Therefore, a strong sense of immersion can be provided. Due to the increased effective monocular visual field, the magnification of the eyepieces does not have to be very high to achieve a good sense of immersion. Therefore, the grain effect experienced by the user can be reduced, and the display quality can be more delicate. For a helmet, an even better display quality can be obtained by utilizing display screens of a larger size and a higher resolution.

In some embodiments, the first display screen 10a and the second display screen 10b may be arranged to face each other and be parallel to each other. For example, as shown in FIG. 1 and FIG. 2, a predetermined distance is formed between the first display screen 10a and the second display screen 10b. The first optical mirror 20a, the second optical mirror 20b, the first eyepiece 30a and the second eyepiece 30b are positioned between the first display screen 10a and the second display screen 10b. The relative position between the first display screen 10a and the second display screen 10b may be determined according to the width of the user's face or head, such that when the wearable apparatus is in use the first display screen 10a and the second display screen 10b may be positioned approximately parallel to each other and on the two sides of the user's eyes, respectively. Therefore, a more pleasurable viewing experience can be provided to the user, and in the meantime more space can be saved to ensure that the entire structure of the wearable apparatus is compact.

Figure 3:
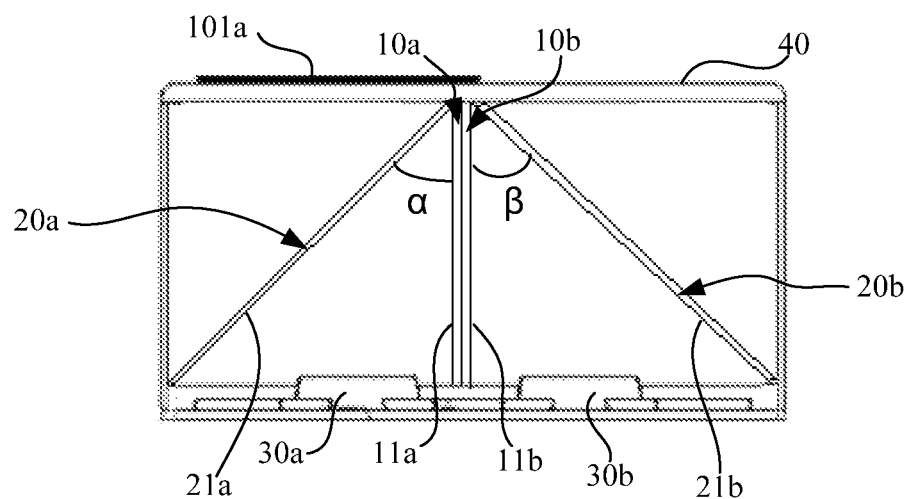
FIG. 3 is a schematic structural diagram of a wearable apparatus according to an example embodiment.

FIG. 3 is a schematic structural diagram of a wearable apparatus according to another example embodiment. The wearable apparatus shown in FIG. 3 differs from that shown in FIG. 2 in that the first display screen 10a and the second display screen 10b of the wearable apparatus shown in FIG. 3 are placed closely against each other. In other words, the display plane 11a of the first display screen 10a and the display plane 11b of the second display screen 10b face away from each other. Consequently, the reflective surface 21a of the first optical mirror 20a faces the display plane 11a of the first display screen 10a, and the reflective surface 21b of the second optical mirror 20b faces the display plane 11b of the second display screen 10b. In this manner, the first display screen 10a and the second display screen 10b are disposed in the middle between the user's two eyes. When the wearable apparatus is being worn by the user, the first display screen 10a and the second display screen 10b are mounted in front of the user's nose bridge. Each of the first display screen 10a and the second display screen 10b may include an ultra-thin display screen to prevent the user's sight from being blocked, thereby ensuring a comfortable viewing experience.

Referring again to FIG. 2, the first predetermined angle α may be approximately equal to the second predetermined angle β. Because the optical axis of the first eyepiece 30a may be nearly parallel to the optical axis of the second eyepiece 30b, the first display screen 10a may also be nearly parallel to the second display screen 10b, the first predetermined angle α may be approximately equal to the second predetermined angle β, and the first optical mirror 20a and the second optical mirror 20b may be arranged symmetrically with respect to the symmetry axis between the first eyepiece 30a and the second eyepiece 30b. Hence, the first optical mirror 20a and the second optical mirror 20b may roughly form the two legs (sides of equal lengths) of an isosceles triangle.

In some embodiments, each of the first predetermined angle α and the second predetermined angle β may be 45°, thus allowing the object image projected by the first display screen 10a via the first optical mirror 20a to be perpendicular to the optical axis of the first eyepiece 30a, and allowing the object image projected by the second display screen 10b via the second optical mirror 20b to be perpendicular to the optical axis of the second eyepiece 30b. Persons skilled in the art would understand that in the practical design of the wearable apparatus, the predetermined angle α and the second predetermined angle β may vary within an allowable range of the error criterion. For example, the allowable range of the first predetermined angle α and the second predetermined angle β may be 45°±5°. When the first predetermined angle α and the second predetermined angle β are set as approximately 45°, the object images projected by the first display screen 10a and the second display screen 10b via the first optical mirror 20a and the second optical mirror 20b may be approximately perpendicular to the optical axes of the first eyepiece 30a and the second eyepiece 30b, respectively. Thus, the user can see the object images right in front. The user experience can be better.

In some embodiments, both the first optical mirror 20a and the second optical mirror 20b may be partially transmissive and partially reflective. When the light emitted from the first display screen 10a is projected via the first optical mirror 20a, it may be reflected into the user's eyes. Similarly, when the light from the second display screen 10b is projected via the second optical mirror 20b, it may be reflected into the user's eyes. In the meantime, the exterior real-world scene may be transmitted through the first optical mirror 20a and the second optical mirror 20b into the user's eyes. That is, the user may see the exterior real-world scene because the first optical mirror 20a and the second optical mirror 20b are partially transmissive. When the contents on the first display screen 10a and the second display screen 10b are reflected into the user's eyes by the first optical mirror 20a and the second optical mirror 20b, the user can see both the current real-world scene and the contents displayed on the display screens, and hence can experience the augmented reality by perceiving the virtual contents from the two display screens 10a and 10b superimposed on the real-world scene.

In the augmented reality mode, the effect of the superimposition of the contents on the display screens and the exterior real-world scene may depend on light transmittances of the first optical mirror 20a and the second optical mirror 20b, the illumination of the exterior environment, and the brightness of the first display screen 10a and the second display screen 10b. The brightness of the first display screen 10a and the second display screen 10b may be automatically adjusted according to the change in the illumination of the exterior environment. The user may also be able to manually adjust the brightness of the first display screen 10a and the second display screen 10b. Hence, a stable superimposition effect can be achieved in different scenes and the user's experience of augmented reality can be improved.

The wearable apparatus can include one or more cameras. The display screen may be electrically coupled with the one or more cameras, and may display contents that match the images captured by the one or more cameras. In some embodiments, the wearable apparatus can further include a processor. The one or more cameras may capture the user's gesture and the processor may execute an operation corresponding to the captured gesture. The one or more cameras may capture a current real scene. The processor may generate related information to match the current real scene captured by the one or more cameras, and control the first display screen 10a and the second display screen 10b to display the contents related to the current real scene. For example, the wearable apparatus may be used to perform pedestrian detection, face recognition, two-dimensional code recognition, etc. In the augmented reality mode, a user wearing the wearable apparatus may see the contents displayed on the display screens and the current exterior real-world scene. Because the superimposed images are virtual images, user can only see the contents displayed on the display screens but may not be able to physically touch the display screens. The one or more cameras may capture the position where the user taps or clicks on the virtual image. For example, when the user taps or clicks on an option menu in the virtual image, the one or more cameras may capture the image containing the user's tapping operation and, if the user's finger remains at a position for a certain period of time, detect the coordinate of the user's finger. By comparing the coordinate of the user's finger with the option menu in the image, the processor can determine a control command corresponding to the tapped option, perform a corresponding operation, and display an image corresponding to the tapped option on the screens. In some embodiments, the gesture for the selection operation can include, e.g., one or more of finger tapping, finger clicking, finger sliding, and frame selection, which is not limited in the present disclosure.

In some embodiments, the wearable apparatus can include one camera that can perform multiple functions, such as pedestrian detection, face recognition, two-dimensional code recognition, and finger coordinate detection. In some other embodiments, the wearable apparatus can include more than one camera that can capture different images for performing the multiple functions. Hence, the number of the one or more cameras is not limited in the present disclosure, and persons skilled in the art may determine the number according to actual needs.

In some embodiments, the wearable apparatus can be used in connection with an unmanned aerial vehicle (UAV). When a user wearing the wearable apparatus is operating the UAV, the user can observe the actual flying status of the UAV within the range of sight and at the same time see the flying related information such as text, image, and/or video contents. For example, information such as flying status, flying direction, flying trajectory, obstacle information, operation instruction, and video and image in the first-person view may be visually displayed by the wearable apparatus. There can be more application scenarios than those listed here.

In some embodiments, each of the first optical mirror 20a and the second optical mirror 20b may be a semi-transmissive/semi-reflective mirror. A semi-transmissive/semi-reflective mirror refers to a mirror that can reflect a portion of incident light and transmit a portion of the incident light, and can include a piece of glass or a piece of organic glass. For example, each of the first optical mirror 20a and the second optical mirror 20b may include a semi-transmissive/semi-reflective film formed on the corresponding reflective surface 21a, 21b. In some embodiments, the first optical mirror 20a and the second optical mirror 20b may comprise the same type of mirror of the same transmittance and reflectance. For example, the first optical mirror 20a may have a transmittance of 30% and a reflectance of 70%. Likewise, the second optical mirror 20b may have a transmittance of 30% and a reflectance of 70%. The superimposition effect (i.e., the display quality of the augmented reality mode) may be determined by the ratio of the transmittance to the reflectance of the first optical mirror 20a and the second optical mirror 20b.

In some embodiments, the wearable apparatus may further include an adjusting device for adjusting the quantity of light passing through the first optical mirror 20a and the second optical mirror 20b.

In the augmented reality mode, the wearable apparatus may need to have a light-transmissive area that allows the user to see the scene in the front. When the light enters the wearable apparatus from the light-transmissive area and passes through the first optical mirror 20a and the second optical mirror 20b into the user's eyes, the user can see the exterior real-world scene. Switching between the virtual reality mode and the augmented mode may require blocking the external light or allowing the external light to pass through the light-transmissive area into the user's eyes. In some embodiments, the adjusting device can be used to control whether the external light can pass through the light-transmissive area. Once the light passes through the light-transmissive area, the light may transmit through the first optical mirror 20a and the second optical mirror 20b into the user's eyes. Thus, the adjusting device can control the quantity of the external light passing through the first optical mirror 20a and the second optical mirror 20b.

When the adjusting device completely blocks the external light, i.e., the quantity of the external light entering the wearable apparatus is zero, there may be no external light transmitting through the first optical mirror 20a and the second optical mirror 20b into the user's eyes. As a result, the user cannot see the exterior scene and thus can immerse in the virtual scene projected by the first display screen 10 and the second display screen 10b via the first optical mirror 20a and the second optical mirror 20b, respectively. That is, the wearable apparatus works in the virtual reality mode. When the adjusting device allows the external light to enter the wearable apparatus (i.e., the passing quantity of the external light is not zero), for example, the external light may be completely incident via the first optical mirror 20a and the second optical mirror 20b without obstruction. As a result, the external light may transmit into the user's eyes through the semi-transmissive/semi-reflective first and second optical mirrors 20a and 20b. In the meantime, the contents displayed on the first display screen 10a and the second display screen 10b can be projected as object images via the first optical mirror 20a and the second optical mirror 20b into the user's eyes. The object images may be superimposed on the real-world scene to allow the user to see both at the same time. That is, the wearable apparatus works in the augmented reality mode.

The wearable apparatus according to some embodiments of the disclosure may adjust the quantity of the external light entering the wearable apparatus through the adjusting device. In the virtual reality mode, the adjusting device blocks the external light from entering the wearable apparatus, i.e., the passing quantity of the external light is zero. In the augmented reality mode, the adjusting device allows the external light to be incident on the first optical mirror 20a and the second optical mirror 20b. Thus, the adjusting device allows both virtual reality and augmented reality to be integrated in the wearable apparatus, and thus the wearable apparatus can switch between the virtual reality mode and the augmented reality mode.

Referring again to FIG. 1 and FIG. 2, in some embodiments, the adjusting device further includes a shading member 40, which faces the other surface of the first optical mirror 20a that is opposite to the reflective surface 21a and the other surface of the second optical mirror 20b that is opposite to the reflective surface 21b. The shading member 40 may be used to block the external light from being incident via the first optical mirror 20a and the second optical mirror 20b.

The wearable apparatus further includes a housing body 50, which can, for example, have a boxlike structure, as shown in FIG. 1. The shading member 40 may have a thin plate structure or another structure. The external light needs to first passes through the shading member 40 before being incident onto the other surface of the first optical mirror 20a that is opposite to the reflective surface 21a and onto the other surface of the second optical mirror 20b that is opposite to the reflective surface 21b. Hence, when the external light is blocked by the shading member 40, the user cannot see the real-world scene and thus can immerse in the virtual scene under the virtual reality mode. The structures of the housing body 50 and the shading member 40 are not limited to those described above. Persons skilled in the art may devise different feasible structures according to actual needs, which are not described here.

In some embodiments, the shading member 40 may have a variable light transmittance and may be electrically coupled with the adjusting device (not shown). The adjusting device may be used to adjust a voltage applied to the shading member 40 for changing the light transmittance of the shading member 40. In some embodiments, the shading member 40 may include a liquid crystal display (LCD) screen. In some other embodiments, the shading member 40 may include another type of transmittance-variable device, e.g., a twisted nematic LCD (TN LCD) screen or a piece of electrochromic glass. Liquid crystal is an organic compound composed of rod-shaped molecules. In the natural state, the long axes of the rod-shaped molecules are roughly parallel to each other. Voltage applied to the LCD screen can be adjusteded to vary the alignment of the liquid crystal molecules, resulting in the light transmitting and light blocking. The shading member 40 may operate in two states—a transparent state and a shading state—by controlling the voltage applied thereto. In the transparent state, the light transmittance may be, e.g., approximately 10%. In the shading state, the external light may be completely blocked by the shading member 40 and the light transmittance may be close to 0%. When the shading member 40 is in the transparent state, the wearable apparatus can work in the augmented reality mode and thus the user may see the exterior real-world scene. On the other hand, when the shading member 40 is in the shading state, the wearable apparatus can work in the virtual reality mode and thus the user cannot see the exterior real-world scene and can only see the contents displayed on the first display screen 10a and the second display screen 10b.

In some embodiments, the shading member 40 can be arranged perpendicular to the first display screen 10a and the second display screen 10b for a good shading performance. Persons skilled in the art would understand that the position of the shading member 40 is not limited to that described above. For example, the shading member 40 may be disposed at an acute or an obtuse angle with respect to the first display screen 10a and the second display screen 10b. The shading member 40 may have a planar shape, a curve shape, or another regular or irregular shape, so long as the function of shading is not affected. The wearable apparatus may include one, two, or more shading members 40. For example, a plurality of shading members 40 may be combined to completely block the external light. In some embodiments, the shading member 40 may include a single member for simplifying the structure. The position, the shape, and the number of the shading member 40 are not limited in the present disclosure, as long as the external light is blocked by the shading member 40 from being entering the wearable apparatus and from transmitting through the first optical mirror 20a and the second optical mirror 20b.

Further, the shading member 40 may be electrically coupled with the adjusting device. The adjusting device may be configured inside the wearable apparatus without being exposed externally to ensure the appearance of the wearable apparatus is neat and compact.

The wearable apparatus consistent with the disclosure may operate in both the virtual reality mode and the augmented reality mode. The light transmittance of the shading member 40 can be adjusteded to control whether the external light can enter the wearable apparatus. In some embodiments, the shading member 40 can be completely opaque if the voltage of a predetermined value is applied to the shading member 40 or if no voltage is applied to the shading member 40, and the wearable apparatus can operate in the virtual reality mode. On the other hand, the shading member 40 can be transparent if the voltage of another predetermined value is applied to the shading member 40, allowing the external light to enter the wearable apparatus and the user to see the exterior real-world scene, and the wearable apparatus can operate in the augmented reality mode.

In some embodiments, the shading member 40 may be configured to be detachable from the housing body 50 of the wearable apparatus. In these embodiments, the shading member 40 may include a common opaque material, e.g., a plastic plate or a wood board. In some embodiments, the weight of the shading member 40 may be light, such that the total weight of the entire wearable apparatus can be reduced and the comfort to wear the wearable apparatus can be enhanced. In these embodiments, switching between the virtual reality mode and the augmented reality mode can be achieved by attaching the shading member 40 to and detaching the shading member 40 from the wearable apparatus. In these embodiments, the shading member 40 also functions as the adjusting device.

The shading member 40 may be attached to the housing body 50 of the wearable apparatus by snapping, docking, threading, etc. Various manners of connection can be employed, and the present disclosure is not limited to those described above.

The wearable apparatus including the detachable shading member 40 may have a simpler structure and a lower cost, and may also adjust the quantity of the external light incident into the wearable apparatus. In some embodiments, an opening may be provided on the housing body 50 in the front of the user's sight. The shading member 40 may be detachably configured at the opening. In some embodiments, the shading member 40 may include a main body and a supporting component (not shown) for ensuring the integrity of the entire apparatus. The supporting component may comprise a transparent glass plate or another transparent material. The supporting component and the main body of the shading member 40 may be arranged in a stacked manner. The supporting component may be secured to the housing body 50 of the wearable apparatus, forming a side wall of the housing body 50. When the external light needs to be blocked, the main body of the shading member 40 can be placed on the inside of the housing body 50 of the wearable apparatus and arranged in a stack with the supporting component. When the external light needs to be allowed to pass, the main body of the shading member 40 can be removed from the housing body 50 of the wearable apparatus. As such, a pleasant appearance and a proper protection of the internal parts of the wearable apparatus can be ensured.

In some embodiments, the wearable apparatus may further include an interpupillary distance adjustment system, which may be coupled to the first eyepiece 30a and the second eyepiece 30b. The interpupillary distance adjustment system may alter the distance between the first eyepiece 30a and the second eyepiece 30b by driving the first eyepiece 30a and/or the second eyepiece 30b to move towards or away from each other. Because different users may have different interpupillary distances, the wearable apparatus with the interpupillary distance adjustment system may accommodate different users. The first eyepiece 30a and the second eyepiece 30b may be configured to be movable on the housing body 50 of the wearable apparatus, thus ensuring that the distance between the first eyepiece 30a and the second eyepiece 30b may be changeable.

In some embodiments, the interpupillary distance adjustment system may be a manual adjustment system. For example, the first eyepiece 30a and the second eyepiece 30b may be configured to be movable via a guide rail coupled to the housing body 50 of the wearable apparatus. The first eyepiece 30a and the second eyepiece 30b may be coupled with a connecting rod and the user may operate the connecting rod to adjust the position of the first eyepiece 30a and/or the position of the second eyepiece 30b. In some other embodiments, the movable first eyepiece 30a and the second eyepiece 30b may be driven by a threaded rod engaged to two threaded nuts at the eyepieces. The threaded rod may have two sections of threads with opposite revolutions. Each section of the threaded rod may be engaged with one threaded nut. The two threaded nuts may be coupled to the first eyepiece 30a and the second eyepiece 30b, respectively. The user may rotate the threaded rod to drive the two threaded nuts, corresponding to the first eyepiece 30a and the second eyepiece 30b respectively, to move towards or away from each other along the threaded rod, thereby driving the first eyepiece 30a and the second eyepiece 30b to move towards or away from each other. Accordingly, the interpupillary distance can be manually adjusted. The distance between the first eyepiece 30a and the second eyepiece 30b can be adjusted according to one of other manners, which are not described here. Persons skilled in the art may design the adjustment system according to actual needs, which are not described here.

In some embodiments, the interpupillary distance may be adjusted automatically. For example, the wearable apparatus can include an interpupillary distance measurement device configured at the housing body 50 of the wearable apparatus. The interpupillary distance adjustment system may alter the distance between the first eyepiece 30a and the second eyepiece 30b according to the interpupillary distance measured by the interpupillary distance measurement device. Thus, the adjustment of the interpupillary distance can be more accurate.

Figure 7:
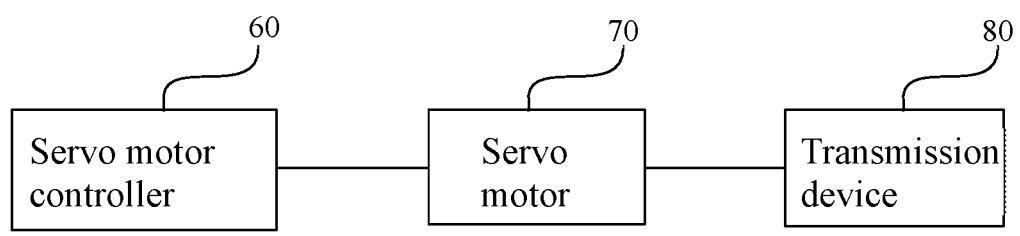
FIG. 7 is a schematic diagram of an interpupillary distance adjustment system according to an example embodiment.

FIG. 7 is a schematic block diagram of an example interpupillary distance adjustment system consistent with the disclosure. As shown in FIG. 7, the interpupillary distance adjustment system includes a servo motor controller 60, a servo motor 70, and a transmission device 80. The servo motor controller 60 may be used to control the rotation angle of the output shaft of the servo motor 70. The transmission device 80 may be used to convert the rotational motion into a linear motion. The servo motor 70 is coupled to an input terminal of the transmission device 80. An output terminal of the transmission device 80 may be coupled to the first eyepiece 30a and the second eyepiece 30b (not shown in FIG. 7).

In some embodiments, the servo motor 70 may include a micro servo motor for fitting into a compact wearable apparatus such as eyeglasses and a helmet. The transmission device 80 may comprise an assembly of threaded rod and nuts described above. The output shaft of the servo motor 70 may be coupled to the threaded rod, for example, by a connection. The servo motor controller 60 may receive the interpupillary distance data measured by the interpupillary distance measurement device and may control the operation of the servo motor 70. In some other embodiments, the servo motor controller 60 may receive a trigger signal from the user and may initiate a start or stop of the servo motor 70 according to the received trigger signal, thus controlling the start or stop of movement of the first earpiece 30a and the second earpiece 30b. As such, the interpupillary distance may be precisely adjusted by altering the distance between the first eyepiece 30a and the second eyepiece 30b via the servo motor 70.

In some embodiments, when the interpupillary distance is being adjusted, the images on the first display screen 10a and the second display screen 10b may be synchronously translated according to the distance between the first eyepiece 30a and the second eyepiece 30b, thus allowing the center of each of the user's eyes, the center of the corresponding eyepiece, and the center of the corresponding image to align in a line. As a result, the viewing comfort can be enhanced.

Figure 4:
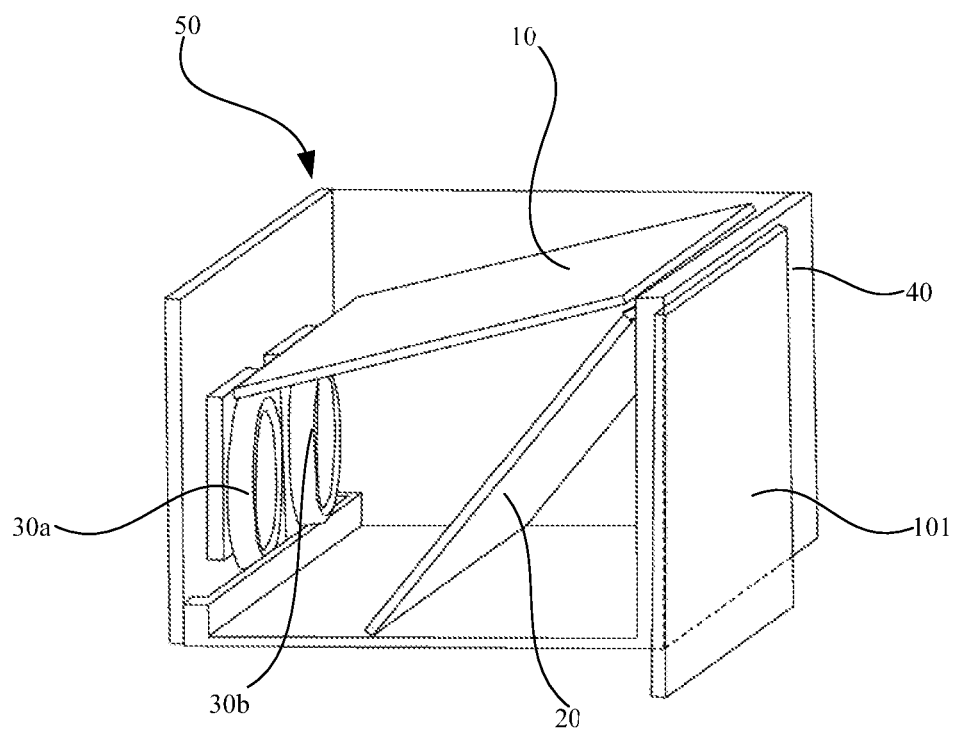
FIG. 4 is a schematic structural diagram of a wearable apparatus according to another example embodiment.
Figure 5:
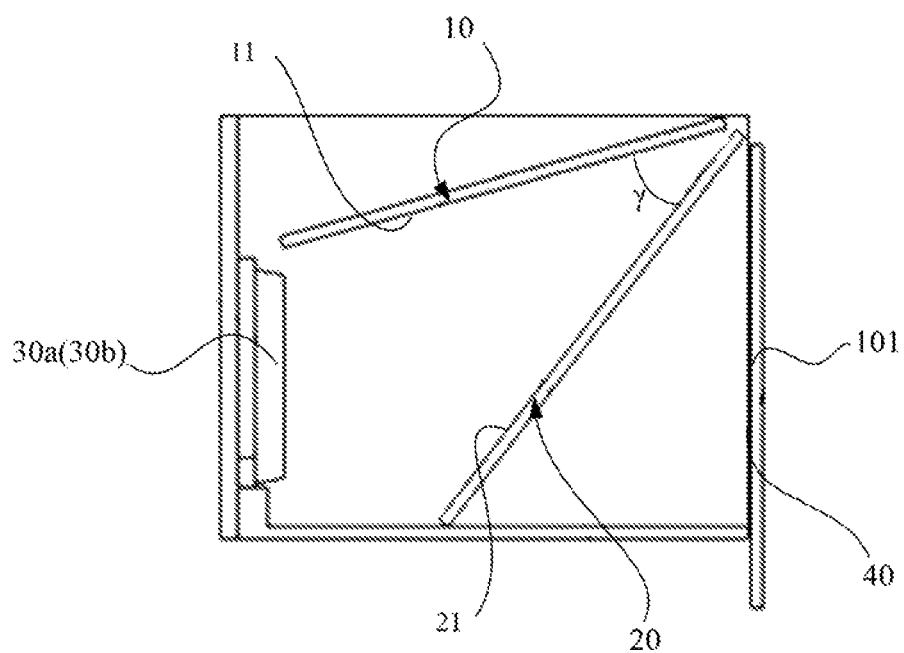
FIG. 5 is a front view of the example wearable apparatus shown in FIG. 4.

FIG. 4 is a schematic structural diagram of another example wearable apparatus consistent with the disclosure. FIG. 5 is a front view of the wearable apparatus shown in FIG. 4. The wearable apparatus may include a plurality of display screens, optical mirrors, a shading member, and an adjusting device. Each of the optical mirrors can have a reflective surface formed on the optical mirror. A predetermined angle may be formed between the display plane of the display screen and the reflective surface of the corresponding optical mirror. The optical mirrors can include semi-transmissive/semi-reflective optical mirrors. The adjusting device may be used to adjust the quantity of the external light passing through the shading member into the wearable apparatus. The wearable apparatus will be described in more detail in connection with FIGS. 1, 2, 4, and 5.

In some embodiments, as shown in FIG. 1 and FIG. 2, the number of the display screens may be two (the first display screen 10a and the second display screen 10b). Correspondingly, the number of the optical mirrors may also be two (the first optical mirror 20a and the second optical mirror 20b), which work in connection with the two display screens. A first predetermined angle α is formed between the reflective surface 21a of the first optical mirror 20a, and a second predetermined angle β is formed between the reflective surface 21b of the second optical mirror 20b and the second display screen 10b.

In some embodiments, the wearable apparatus may include one display screen and one optical mirror, such as the display screen 10 and the optical mirror 20 shown in FIG. 4 and FIG. 5. As shown in FIG. 4 and FIG. 5, the angle between the display screen 10 and the optical mirror 20 is γ.

The display screen may include a monitor having a display function, and the physical shape and structure of the display screen are not limited here. For example, the display screen may include an LCD or an OLED. When the light emitted from the display screen is projected via the optical mirror, the emitted light is reflected into the user's eyes. In the meantime, the optical mirror having a light transmission function may allow the user to observe the exterior real-world scene. The effect of augmented reality may be realized by the superimposition of the exterior real scene and the displayed virtual contents.

In the augmented reality mode, the effect of the superimposition of the contents on the display screen and the exterior real-world scene may depend on light transmittance of the optical mirror, the illumination of the exterior environment, and the brightness of the display screen. The brightness of the display screen may be automatically adjusted according to the change in the illumination of the exterior environment. The user may also be able to manually adjust the brightness of the display screen. Hence, a stable superimposition effect can be achieved in different scene and the user's experience of augmented reality can be improved.

The wearable apparatus can include one or more cameras. The display screen may be electrically coupled with the one or more cameras, and may display contents that match the images captured by the one or more cameras. In some embodiments, the wearable apparatus can further include a processor. The one or more cameras may capture the user's gesture and the processor may execute an operation corresponding to the captured gesture. The one or more cameras may capture a current real scene. The processor may generate related information to match the current real scene captured by the one or more cameras, and control the display screen to display the contents related to the current real scene. For example, the wearable apparatus may be used to perform pedestrian detection, face recognition, two-dimensional code recognition, etc. In the augmented reality mode, a user wearing the wearable apparatus may see the contents displayed on the display screens and the current exterior real-world scene. Because the superimposed images are virtual images, user can only see the contents displayed on the display screens but may not be able to physically touch the display screens. The one or more cameras may capture the position where the user taps or clicks on the virtual image. For example, when the user taps or clicks on an option menu in the virtual image, the one or more cameras may capture the image containing the user's tapping operation and, if the user's finger remains at a position for a certain period of time, detect the coordinate of the user's finger. By comparing the coordinate of the user's finger with the option menu in the image, the processor can determine a control command corresponding to the tapped option, perform a corresponding operation, and display an image corresponding to the tapped option on the screens. In some embodiments, the gesture for the selection operation can include, e.g., one or more of finger tapping, finger clicking, finger sliding, and frame selection, which is not limited in the present disclosure.

In some embodiments, the wearable apparatus can include one camera that can perform multiple functions, such as pedestrian detection, face recognition, two-dimensional code recognition, and finger coordinate detection. In some other embodiments, the wearable apparatus can include more than one camera that can capture different images for performing the multiple functions. Hence, the number of the one or more cameras is not limited in the present disclosure, and persons skilled in the art may determine the number according to actual needs.

In some embodiments, the wearable apparatus can be used in connection with an unmanned aerial vehicle (UAV). When a user wearing the wearable apparatus is operating the UAV, the user can observe the actual flying status of the UAV within the range of sight and at the same time see the flying related information such as text, image, and/or video contents. For example, information such as flying status, flying direction, flying trajectory, obstacle information, operation instruction, and video and image in the first-person view may be visually displayed by the wearable apparatus. There can be more application scenarios than those listed here.

In some embodiments, the optical mirror is a semi-transmissive/semi-reflective mirror. A semi-transmissive/semi-reflective mirror refers to a mirror that can reflect a portion of the incident light and transmit a portion of the incident light, and can include a piece of glass or a piece of organic glass. For example, a semi-transmissive/semi-reflective film may be coated on the reflective surface of the optical mirror. In some embodiments, for example, the optical mirror may have a transmittance of 30% and a reflectance of 70%. The ratio of the transmittance to the reflectance of the optical mirror may vary and is not limited to that described above. The superimposition effect (i.e., the display quality of the augmented reality mode) may be determined by the ratio of the transmittance to the reflectance of the optical mirror.

In some embodiments, the wearable apparatus may include a light-transmissive area that allows the user to see the scene in the front. When the light enters the wearable apparatus from the light-transmissive area and passes through the optical mirror into the user's eyes, the user can see the exterior real-world scene. Switching between the virtual reality mode and the augmented mode may require blocking the external light or allowing the external light to pass through the light-transmissive area into the user's eyes. In some embodiments, the adjusting device can be used to control whether the external light can pass through the light-transmissive area. Once the light passes through the light-transmissive area, the light may transmit through the optical mirror into the user's eyes.

In some embodiments, the quantity of the external light passing through the shading member into the wearable apparatus may be adjusted via the adjusting device. If the adjusting device blocks the external light from entering the wearable apparatus to change the passing quantity of the external light to zero, no light may passes through the optical mirror into the user's eyes. As a result, the user cannot see the exterior scene and thus can immerse in the object scene projected by the display screen via the optical mirror. That is, the wearable apparatus is working in the virtual reality mode. On the other hand, if the adjusting device allows the external light to enter the wearable apparatus and the passing quantity of the external light does not equal to zero—for example, the external light may be completely incident via the optical mirror without obstruction, or the external light may partially transmit into the user's eyes through the semi-transmissive/semi-reflective optical mirror—the object image formed by the reflection of the contents displayed on the display screens via the optical mirror may be superimposed on the exterior scene, thereby enabling the augmented reality mode.

According to the existing technologies, either the virtual reality mode or the augmented reality mode may be provided in a wearable apparatus, but the virtual reality mode and the augmented reality mode cannot be both provided in a single wearable apparatus, let alone the switching between the two modes. The wearable apparatus consistent with the disclosure may adjust the quantity of the external light transmitting through the optical mirror by the adjusting device. The virtual reality mode may be switched on when the passing quantity of the external light equals zero, and the augmented reality may be switched on when the external light is allowed to be incident via the optical mirror. Thus, by means of the adjusting device, the wearable apparatus can integrate virtual reality and augmented reality into one system, and can also switch between the virtual reality and the augmented reality.

In some embodiments, the shading member 40 may face the other surface of the optical mirror that is opposite to the reflective surface of the optical mirror. The shading member 40 may be used to inhibit the external light of the exterior real-world scene from being incident onto the optical mirror. For example, as shown in FIG. 1 and FIG. 2, the shading member 40 faces the other surface of the first optical mirror 20a that is opposite to the reflective surface 21a, and as shown in the FIG. 4 and FIG. 5, the shading member 40 faces the other surface of the optical mirror 20 that is opposite to the reflective surface 21.

The wearable apparatus consistent with the disclosure may further include a housing body 50. As shown in FIG. 1 and FIG. 4, the housing body 50 can have a boxlike structure. The shading member 40 may have a thin plate structure or another structure. The external light may need to pass through the shading member before being incident onto the reflective surface of the optical mirror. Hence, when the shading member blocks the external light from being incident via the optical mirror, the user cannot see the real-world scene in the front and thus can immerse in the virtual contents of the virtual reality mode. The structures of the housing body 50 and the shading member 40 are not be limited to those described above. Persons skilled in the art may devise different feasible structures according to actual needs, which are not described here.

In some embodiments, the angle between the shading member 40 and the optical mirror may be nearly equal to the predetermined angle between the display screen and the optical mirror. For example, as shown in FIG. 1 and FIG. 2, the angle between the shading member 40 and the first optical mirror 20a is nearly equal to the angle between the first display screen 10a and the first optical mirror 20a, and the angle between the shading member 40 and the second optical mirror 20b is nearly equal to the angle between the second display screen 10b and the second optical mirror 20b, and as shown in FIG. 4 and FIG. 5, the optical mirror 20 is obliquely disposed in the housing body 50 of the wearable apparatus. The display screen 10 is placed to form a predetermined angle with the optical mirror 20, and the angle between the optical mirror 20 and the shading member 40 is nearly equal to the predetermined angle between the display screen 10 and the optical mirror 20.

In some embodiments, the shading member 40 may have a variable light transmittance and may be electrically coupled with the adjusting device (not shown). The adjusting device may be used to adjust a voltage applied to the shading member 40 for changing the light transmittance of the shading member 40. In some embodiments, the shading member 40 may include a liquid crystal display (LCD) screen. In some other embodiments, the shading member 40 may include another type of transmittance-variable device, e.g., a twisted nematic LCD (TN LCD) screen or a piece of electrochromic glass. Liquid crystal is an organic compound composed of rod-shaped molecules. In the natural state, the long axes of the rod-shaped molecules are roughly parallel to each other. Voltage applied to the LCD screen can be adjusted to vary the alignment of the liquid crystal molecules, resulting in the light transmitting and light blocking. The shading member 40 may operate in two states—a transparent state and a shading state—by controlling the voltage applied thereto. In the transparent state, the light transmittance may be, e.g., approximately 10%. In the shading state, the external light may be completely blocked by the shading member 40 and the light transmittance may be close to 0%. When the shading member 40 is in the transparent state, the wearable apparatus can work in the augmented reality mode and thus user may see the exterior real-world scene. On the other hand, when the shading member 40 is in the shading state, the wearable apparatus can work in the virtual reality mode and thus the user cannot see the exterior real-world scene and can only see the contents displayed on the display screen.

The wearable apparatus consistent with the disclosure may operate in both the virtual reality mode and the augmented reality mode. The light transmittance of the shading member 40 can be adjusted to control whether the external light can enter the wearable apparatus. In some embodiments, the shading member 40 can be completely opaque if the voltage of a predetermined value is applied to the shading member 40 or if no voltage is applied to the shading member 40, and the wearable apparatus may operate in the virtual reality mode. On the other hand, the shading member 40 can be transparent if the voltage of another predetermined value is applied to the shading member 40, allowing the external light to enter the wearable apparatus and the user to see the exterior real-world scene, and the wearable apparatus may operate in the augmented reality mode.

In some embodiments, the shading member 40 may be configured to be detachable from the housing body 50 of the wearable apparatus. In these embodiments, the shading member 40 may include a common opaque material, e.g., a plastic plate or a wood board. In some embodiments, the weight of the shading member 40 may be light, such that the total weight of the entire wearable apparatus can be reduced and the comfort to wear the wearable apparatus can be enhanced. In these embodiments, switching between the virtual reality mode and the augmented reality mode can be achieved by attaching the shading member 40 to and detaching the shading member 40 from the wearable apparatus. In these embodiments, the shading member 40 also functions as the adjusting device.

The shading member 40 may be configured to be detachable from the housing body 50 of the wearable apparatus by snapping, docking, threading, etc. Various manners of connection can be employed and the present disclosure is not limited to those described above.

The wearable apparatus including the detachable shading member 40 may have a simpler structure and a lower cost, and may also adjust the quantity of the external light incident into the inside of the wearable apparatus. In some embodiments, an opening may be provided on the housing body 50 in the front of the user's sight. The shading member 40 may be detachably configured at the opening. In some embodiments, the shading member 40 may include a main body and a supporting component (not shown) for ensuring the integrity of the entire apparatus. The supporting component may comprise a transparent glass plate or another transparent material. The supporting component and the main body of the shading member 40 may be arranged in a stacked manner. The supporting component may be secured to the housing body 50 of the wearable apparatus, forming a side wall of the housing body 50. When the external light needs to be blocked, the main body of the shading member 40 can be placed on the inside of the housing body 50 of the wearable apparatus and arranged in a stack with the supporting component. When the external light needs to be allowed to pass, the main body of the shading member 40 can be removed from the housing body 50 of the wearable apparatus. As such, a pleasant appearance and a proper protection of the internal parts of the wearable apparatus can be ensured.

In some embodiments, as shown in FIGS. 1 to 5, the wearable apparatus can further include the first eyepiece 30a and the second eyepiece 30b. The first eyepiece 30a and the second eyepiece 30b may be configured between the display planes of the display screens and the reflective surfaces of the optical mirrors.

For example, as shown in FIG. 1 and FIG. 2, the first eyepiece 30a is configured between the display plane 11a of the first display screen 10a and the reflective surface 21a of the first optical mirror 20a, and the second eyepiece 30b is configured between the display plane 11b of the second display screen 10b and the reflective surface 21b of the second optical mirror 20b. In some embodiments, the first display screen 10a and the second display screen 10b may be arranged to face each other and be parallel to each other.

In these embodiments, a predetermined distance may be formed between the first display screen 10a and the second display screen 10b. The first optical mirror 20a, the second optical mirror 20b, the first eyepiece 30a and the second eyepiece 30b may be positioned between the first display screen 10a and the second display screen 10b. The relative position between the first display screen 10a and the second display screen 10b may be determined according to the width of the user's face or head, such that when the wearable apparatus is in use the first display screen 10a and the second display screen 10b may be positioned approximately parallel to each other and on the two sides of the user's eyes, respectively. Therefore, a more pleasurable viewing experience can be provided to the user, and in the meantime more space can be saved to ensure that the entire structure of the wearable apparatus is compact.

In some embodiments, the first predetermined angle, α, between the first display screen 10a and the first optical mirror 20a may be approximately equal to the second predetermined angle, β, between the second display screen 10b and the second optical mirror 20b. Because the optical axis of the first eyepiece 30a may be nearly parallel to the optical axis of the second eyepiece 30b, the first display screen 10a may also be nearly parallel to the second display screen 10b, the first predetermined angle α may be approximately equal to the second predetermined angle β, and the first optical mirror 20a and the second optical mirror 20b may be arranged symmetrically with respect to the symmetry axes between the first eyepiece 30a and the second eyepiece 30b. Hence, the first optical mirror 20a and the second optical mirror 20b may roughly form the two legs (sides of equal lengths) of an isosceles triangle.

In some embodiments, each of the first predetermined angle α and the second predetermined angle β may be 45°, thus allowing the object image projected by the first display screen 10a via the first optical mirror 20a to be perpendicular to the optical axis of the first eyepiece 30a, and allowing the object image projected by the second display screen 10b via the second optical mirror 20b to be perpendicular to the optical axis of the second eyepiece 30b. Persons skilled in the art would understand that in the practical design of the wearable apparatus, the first predetermined angle α and the second predetermined angle b may vary within an allowable range of the error criterion. For example, the allowable range of the first predetermined angle α and the second predetermined angle β may be 45°±5°. When the first predetermined angle α and the second predetermined angle β are set as approximately 45°, the object images projected by the first display screen 10a and the second display screen 10b via the first optical mirror 20a and the second optical mirror 20b may be approximately perpendicular to the optical axes of the first eyepiece 30a and the second eyepiece 30b, respectively. Thus, the user can see the object images right in front. The user experience can be better.

In some embodiments, as shown in FIG. 4 and FIG. 5, each of the first eyepiece 30a and the second eyepiece 30b is disposed between the display plane 11 of the display screen 10 and the reflective surface 21 of the optical mirror 20, such that the user may see the contents via the first eyepiece 30a and the second eyepiece 30b by reflection of the images on the display screen 10 via the optical mirror 20.

Further, the object images projected by the display plane of the display screen via the optical mirror may be approximately perpendicular with the optical axes of the first eyepiece 30a and the second eyepiece 30b. For example, as shown in FIG. 1 and FIG. 2, the object image 101a projected by the display plane 11a of the first display screen 10a via the first optical mirror 20a is approximately perpendicular to the optical axes of the first eyepiece 30a and the second eyepiece 30b, and the object image (not shown) projected by the display plane 11b of the second display screen 10b via the second optical mirror 20b is approximately perpendicular to the optical axes of the first eyepiece 30a and the second eyepiece 30b. In some other embodiments, as shown in FIG. 4 and FIG. 5, the object image 101 projected by the display plane 11 of the display screen 10 via the optical mirror 20 is approximately perpendicular to the optical axes of the first eyepiece 30a and the second eyepiece 30b. When using the wearable apparatus, the user can look through the first eyepiece 30a with the user's left eye, and can look through the second eyepiece 30b with the user's right eye. The object image projected by the display plane of the display screen via the optical mirror may be approximately perpendicular to the optical axes of the first eyepiece 30a and the second eyepiece 30b. As a result, the distances between various points on the object image and the eyepiece can be the same, thereby preventing the object images from deforming into trapezoids to deteriorate viewing effect.

Persons skilled in the art would understand that in an optical system the eyepiece is generally an optical element for magnifying an image produced by an objective lens. Thus, the images viewed by a user through the first eyepiece 30a and the second eyepiece 30b may be magnified. In some embodiments, both the first eyepiece 30a and the second eyepiece 30b may include a lens set including at least one convex lens and at least one concave lens. The convex lens may further magnify the image, widen the field of view, and enhance the sense of immersion. The concave lens may limit the field of view and allow a certain range of light to pass through the lens set.

In some embodiments, when the number of the display screens is two, as shown in FIG. 1 and FIG. 2, the images displayed on the first display screen 10a and the second display screen 10b are reflected by the first optical mirror 20a and the second optical mirror 20b into the user's eyes, thus allowing the user to see the contents on the first display screen 10a and the second display screen 10b. For example, the contents on the first display screen 10a may be viewed by the left eye of the user, while the contents on the second display screen 10b may be viewed by the right eye of the user. The sensation of 3D may be generated due to binocular parallax. In some other embodiments, when the number of the display screens is one, as shown in FIG. 4 and FIG. 5, the sense of immersion can be achieved by magnifying the images on the display screen 10 via the first eyepiece 30a and the second eyepiece 30b.

In some embodiments, the wearable apparatus may further include an interpupillary distance adjustment system, which may be coupled to the first eyepiece 30a and the second eyepiece 30b. The interpupillary distance adjustment system may alter the distance between the first eyepiece 30a and the second eyepiece 30b by driving the first eyepiece 30a and/or the second eyepiece 30b to move towards or away from each other. Because different users may have different interpupillary distances, the wearable apparatus with the interpupillary distance adjustment system may accommodate different users. The first eyepiece 30a and the second eyepiece 30b may be configured to be movable on the housing body 50 of the wearable apparatus, thus ensuring that the distance between the first eyepiece 30a and the second eyepiece 30b may be changeable.

The interpupillary distance adjustment system may be a manual adjustment system. For example, the first eyepiece 30a and the second eyepiece 30b may be configured to be movable via a guide rail coupled to the housing body 50 of the wearable apparatus. The first eyepiece 30a and the second eyepiece 30b may be connected with a connecting rod and the user may operate the connecting rod to adjust the position of the first eyepiece 30a and/or the position of the second eyepiece 30b. In some other embodiments, the movable first eyepiece 30a and the second eyepiece 30b may be driven by a threaded rod engaged to two threaded nuts at the eyepieces. The threaded rod may have two sections of threads with opposite revolutions. Each section of the threaded rod may be engaged with one threaded nut. The two threaded nuts may be coupled to the first eyepiece 30a and the second eyepiece 30b, respectively. The user may rotate the threaded rod to drive the two threaded nuts, corresponding to the first eyepiece 30a and the second eyepiece 30b respectively, to move towards or away from each other along the threaded rod, thereby driving the first eyepiece 30a and the second eyepiece 30b to move towards or away from each other. Accordingly, the interpupillary distance can be manually adjusted. The distance between the first eyepiece 30a and the second eyepiece 30b can be adjusted according to one of other manners, which are not described here. Persons skilled in the art may design the adjustment system according to actual needs, which are not described here.

In some embodiments, the interpupillary distance may be adjusted automatically. For example, the wearable apparatus can include an interpupillary distance measurement device configured at the housing body 50 of the wearable apparatus. The interpupillary distance adjustment system may alter the distance between the first eyepiece 30a and the second eyepiece 30b according to the interpupillary distance measured by the interpupillary distance measurement device. Thus, the adjustment of the interpupillary distance can be more accurate.

FIG. 7 is a schematic block diagram of an example interpupillary distance adjustment system consistent with the disclosure. As shown in FIG. 7, the interpupillary distance adjustment system includes a servo motor controller 60, a servo motor 70, and a transmission device 80. The servo motor controller 60 may be used to control the rotation angle of the output shaft of the servo motor 70. The transmission device 80 may be used to convert the rotational motion into a linear motion. The servo motor 70 may be connected to an input terminal of the transmission device 80. An output terminal of the transmission device 80 may be connected to the first eyepiece 30a and the second eyepiece 30b.

In some embodiments, the servo motor 70 may include a micro servo motor for fitting into a compact wearable apparatus such as eyeglasses and a helmet. The transmission device 80 may comprise an assembly of threaded rod and nuts described above. The output shaft of the servo motor 70 may be coupled to the threaded rod, for example, by a coupling. The servo motor controller 60 may receive the interpupillary distance data measured by the interpupillary distance measurement device and may control the operation of the servo motor 70. In some other embodiments, the servo motor controller 60 may receive a trigger signal from the user and may initiate a start or stop of the servo motor 70 according to the received trigger signal, thus controlling the start or stop of movement of the first earpiece 30a and the second earpiece 30b. As such, the interpupillary distance may be precisely adjusted by altering the distance between the first eyepiece 30a and the second eyepiece 30b via the servo motor 70.

In some embodiments, when the interpupillary distance is being adjusted, the images on the first display screen 10a and the second display screen 10b may be synchronously translated according to the distance between the first eyepiece 30a and the second eyepiece 30b, thus allowing the center of each of the user's eyes, the center of the corresponding eyepiece, and the center of the corresponding image to align in a line. As a result, the viewing comfort can be enhanced.

Referring again to FIG. 1 and FIG. 2, the wearable apparatus consistent with the disclosure may include the first display screen 10a, the second display screen 10b, the first optical mirror 20a, the second optical mirror 20b, the shading member and the adjusting device.

Reflective surfaces, 21a and 21b, may be formed on the first optical mirror 20a and the second optical mirror 20b, respectively. The first predetermined angle, α, may be formed between the display plane 11a of the first display screen 10a and the reflective surface 21a of the first optical mirror 20a. The second predetermined angle, β, may be formed between the display plane 11b of the second display screen 10b and the reflective surface 21b of the second optical mirror 20b. Each of the first optical mirror 20a and the second optical mirror 20b may be semi-transmissive/semi-reflective. The adjusting device may be used to adjust the quantity of the external light passing through the shading member into the wearable apparatus.

The first display screen 10a and the second display screen 10b may include monitors having a display function. The physical shape and structure thereof may not be specifically limited. For example, the first display screen 10a and the second display screen 10b may each include a liquid crystal display (LCD). In some other embodiments, the first display screen 10a and the second display screen 10b may each include an organic light-emitting diode (OLED) display. The first display screen 10a and the second display screen 10b may be of a type other than LCD and OLED. In some embodiments, the first display screen 10a and the second display screen 10b may be of different types. The images displayed on the first display screen 10a and the second display screen 10b may be reflected by the first optical mirror 20a and the second optical mirror 20b, respectively, into the user's eyes, thus allowing the user to watch the contents presented on the first display screen 10a and the second display screen 10b. For example, the content on the first display screen 10a may be viewed by the left eye of the user, while the content on the second display screen 10b may be viewed by the right eye. The sensation of 3D may be generated due to binocular parallax.

The first predetermined angle α may be formed between the reflective surface 21a of the first optical mirror 20a and the first display screen 10a. The second predetermined angle β may be formed between the reflective surface 21b of the second optical mirror 20b and the second display screen 10b. The values of the first predetermined angle α and the second predetermined angle β may be set according to the actual need, which are not limited here. Consistent with the disclosure, however, the first predetermined angle, α, and the second predetermined angle, β, can be set to ensure that the contents on the first display screen 10a and the second display screen 20a can be completely projected via the first optical mirror 20a and the second optical mirror 20b, respectively. As a result, the user can see both the contents on the display screens and the exterior real-world scene via the semi-transmissive/semi-reflective first and second optical mirrors, 20a and 20b.

In some embodiments, each of the first optical mirror 20a and the second optical mirror 20b may be semi-transmissive/semi-reflective, and the adjusting device may adjust the quantity of the external light passing through the optical mirror 20a and the second optical mirror 20b. When the adjusting device completely blocks the external light, i.e., the quantity of the external light entering into the wearable apparatus is zero, there may be no external light transmitting through the first optical mirror 20a and the second optical mirror 20b into the user's eyes. As a result, the user cannot see the exterior scene and thus can immerse in the virtual scene projected by the first display screen 10 and the second display screen 10b via the first optical mirror 20a and the second optical mirror 20b, respectively. That is, the wearable apparatus works in the virtual reality mode. When the adjusting device allows the external light to enter the wearable apparatus (i.e., the passing quantity of the external light is not zero), for example, the external light may be completely incident onto the first optical mirror 20a and the second optical mirror 20b without obstruction. As a result, the external light may transmit into the user's eyes through the semi-transmissive/semi-reflective first and second optical mirrors 20a and 20b. In the meantime, the contents displayed on the first display screen 10a and the second display screen 10b can be projected as object images via the first optical mirror 20a and the second optical mirror 20b into the user's eyes. The object images may be superimposed on the real-world scene to allow the user to see both at the same time. That is, the wearable apparatus works in the augmented reality mode.

In some embodiments, each of the first optical mirror 20a and the second optical mirror 20b can be a semi-transmissive/semi-reflective mirror. A semi-transmissive/semi-reflective mirror refers to a mirror that can reflect a portion of incident light and transmit a portion of the incident light, and can include a piece of glass or a piece of organic glass. For example, the first optical mirror 20a and the second optical mirror 20b may each include a semi-transmissive/semi-reflective film formed on the corresponding reflective surface 21a, 21b. In some embodiments, the first optical mirror 20a and the second optical mirror 20b may comprise the same type of mirror of the same transmittance and reflectance. For example, the first optical mirror 20a may have a transmittance of 30% and a reflectance of 70%. Likewise, the second optical mirror 20b may have a transmittance of 30% and a reflectance of 70%. The superimposition effect (i.e., the display quality of the augmented reality mode) may be determined by the ratio of the transmittance to the reflectance of the first optical mirror 20a and the second optical mirror 20b.

In the augmented reality mode, the effect of the superimposition between the content displayed on the display screen and the exterior real-world scene may depend on the light transmittance of the first optical mirror 20a and the second optical mirror 20b, the illumination of the exterior environment, and the brightness of the first display screen 10a and the second display screen 10b. The brightness of each of the first display screen 10a and the second display screen 10b may be automatically adjusted according to the change in the illumination of the exterior environment. The user may also be able to manually adjust the brightness of each of the first display screen 10a and the second display screen 10b. Hence, a stable superimposition effect can be achieved in different scenes and the user's experience of augmented reality can be improved.

The wearable apparatus can include one or more cameras. Each of the first display screen 10a and the second display screen 10b may be electrically coupled with the one or more cameras, and each may display contents that match the images captured by the one or more cameras. In some embodiments, the wearable apparatus can further include a processor. The one or more cameras may capture the user's gesture and the processor may execute an operation corresponding to the captured gesture. The one or more cameras may capture a current real scene. The processor may generate related information to match the current real scene captured by the one or more cameras, and control the first display screen 10a and the second display screen 10b to display the contents related to the current real scene. For example, the wearable apparatus may be used to perform pedestrian detection, face recognition, two-dimensional code recognition, etc. In the augmented reality mode, a user wearing the wearable apparatus may see the contents displayed on the display screens and the current exterior real-world scene. Because the superimposed images are virtual images, user can only see the contents displayed on the display screens but may not be able to physically touch the display screens. The one or more cameras may capture the position where the user taps or clicks on the virtual image. For example, when the user taps or clicks on an option menu in the virtual image, the one or more cameras may capture the image containing the user's tapping operation and, if the user's finger remains at a position for a certain period of time, detect the coordinate of the user's finger. By comparing the coordinate of the user's finger with the option menu in the image, the processor can determine a control command corresponding to the tapped option, perform a corresponding operation, and display an image corresponding to the tapped option on the screens. In some embodiments, the gesture for the selection operation can include, e.g., one or more of finger tapping, finger clicking, finger sliding, and frame selection, which is not limited in the present disclosure.

In some embodiments, the wearable apparatus can include one camera that can perform multiple functions, such as pedestrian detection, face recognition, two-dimensional code recognition, and finger coordinate detection. In some other embodiments, the wearable apparatus can include more than one camera that can capture different images for performing the multiple functions. Hence, the number of the one or more cameras is not limited in the present disclosure, and those skilled in the art may determine the number according to actual needs.

In some embodiments, the wearable apparatus can be used in connection with an unmanned aerial vehicle (UAV). When a user wearing the wearable apparatus is operating the UAV, the user can observe the actual flying status of the UAV within the range of sight and at the same time see the flying related information such as text, image, and/or video content. For example, information such as flying status, flying direction, flying trajectory, obstacle information, operation instruction, and video and image in the first-person view may be visually displayed by the wearable apparatus. There can be more application scenarios than those listed here.

According to the existing technologies, either the virtual reality mode or the augmented reality mode may be provided in a wearable apparatus, but the virtual reality mode and the augmented reality mode cannot be both provided in a single wearable apparatus, let alone the switching between the two modes. The wearable apparatus can be, e.g., eyeglasses or a helmet, which is not limited in the present disclosure. Consistent with the disclosure, the wearable apparatus may display contents using two display screens (the first display screen 10a and the second display screen 10b), and may project the displayed contents into the user's left and right eyes via the first optical mirror 20a and the second optical mirror 20b. Each of the first optical mirror 20a and the second optical mirror 20b may be semi-transmissive/semi-reflective, and the adjusting device may adjust the quantity of the external light transmitting through the first optical mirror 20a and the second optical mirror 20b. Thus, the adjusting device can allow both virtual reality and augmented reality to be integrated in the wearable apparatus, and thus the wearable apparatus can switch between the virtual reality mode and the augmented reality mode.

In some embodiments, the adjusting device may further include a shading member 40, which faces the other surface of the first optical mirror 20a that is opposite to the reflective surface 21a and the other surface of the second optical mirror 20b that is opposite to the reflective surface 21b. The shading member 40 may be used to block the external light from being incident onto the first optical mirror 20a and the second optical mirror 20b.

The wearable apparatus further includes a housing body 50, which can, for example, have a boxlike structure, as shown in FIG. 1. The shading member 40 may have a thin plate structure or another structure. The external light needs to first passes through the shading member 40 before being incident onto the other surface of the first optical mirror 20a that is opposite to the reflective surface 21a and onto the other surface of the second optical mirror 20b that is opposite to the reflective surface 21b. Hence, when the external light is blocked by the shading member 40, the user cannot see the real-world scene and thus can immerse in the virtual scene under the virtual reality mode. The structures of the housing body 50 and the shading member 40 are limited to those described above. Persons skilled in the art may devise different feasible structures according to actual needs, which are described here.

According to some embodiments of the disclosure, the shading member 40 may control the quantity of the external light incident onto the first optical mirror 20a and the second optical mirror 20b, thus realizing the switching between the virtual reality mode and the augmented reality mode.

In some embodiments, the shading member 40 may have a variable light transmittance and may be electrically coupled with the adjusting device (not shown). The adjusting device may be used to adjust a voltage applied to the shading member 40 for changing the light transmittance of the shading member 40. In some embodiments, the shading member 40 may include a liquid crystal display (LCD) screen. In some other embodiments, the shading member 40 may include another type of transmittance-variable device, such as a twisted nematic LCD (TN LCD) screen or a piece of electrochromic glass. Liquid crystal is an organic compound composed of rod-shaped molecules. In the natural state, the long axes of the rod-shaped molecules are roughly parallel to each other. Voltage applied to the LCD screen can be adjusteded to vary the alignment of the liquid crystal molecules, resulting in the light transmitting and light blocking. The shading member 40 may operate in two states—a transparent state and a shading state—by controlling the voltage applied thereto. In the transparent state, the light transmittance may be, e.g., approximately 10%. In the shading state, the external light may be completely blocked by the shading member 40 and the light transmittance may be close to 0%. When the shading member 40 is in the transparent state, the wearable apparatus can work in the augmented reality mode and thus user may see the exterior real-world scene. On the other hand, when the shading member 40 is in the shading state, the wearable apparatus can work in the virtual reality mode and thus the user cannot see the exterior real-world scene and can only see the contents on the display screen.

In some embodiments, the shading member 40 can be arranged perpendicular to the first display screen 10a and the second display screen 10b for a good shading performance. Persons skilled in the art would understand that the position of the shading member 40 is not limited to that described above. For example, the shading member 40 may be disposed at an acute or an obtuse angle with respect to the first display screen 10a and the second display screen 10b. The shading member 40 may have a planar shape, a curve shape, or another regular or irregular shape, so long as the function of shading is not affected. The wearable apparatus may include one, two, or more shading members 40. For example, a plurality of shading members 40 may be combined to completely block the external light. In some embodiments, the shading member 40 may include a single member for simplifying the structure. The position, the shape, and the number of the shading member 40 are not limited in the present disclosure, as long as the external light is blocked by the shading member 40 from being entering the wearable apparatus and from transmitting through the first optical mirror 20a and the second optical mirror 20b.

Further, the shading member 40 may be electrically connected with the adjusting device. The adjusting device may be configured inside the wearable apparatus without being exposed externally to ensure the appearance of the wearable apparatus is neat and compact.

The wearable apparatus consistent with the disclosure may operate in both the virtual reality mode and the augmented reality mode. The light transmittance of the shading member 40 can be adjusted to control whether the external light can enter the wearable apparatus. In some embodiments, the shading member 40 can be completely opaque if the voltage of a predetermined value is applied to the shading member 40 or if no voltage is applied to the shading member 40, and the wearable apparatus may operate in the virtual reality mode. On the other hand, the shading member 40 can be transparent if the voltage of another predetermined value is applied to the shading member 40, allowing the external light to enter the wearable apparatus and the user to see the exterior real-world scene, and the wearable apparatus may operate in the augmented reality mode.

In some embodiments, the shading member 40 may be configured to be detachable from the housing body 50 of the wearable apparatus. In these embodiments, the shading member 40 may include a common opaque material, such as a plastic plate or a wood board. In some embodiments, the weight of the shading member 40 may be light, such that the total weight of the entire wearable apparatus can be reduced and the comfort to wear the wearable apparatus can be enhanced. In these embodiments, switching between the virtual reality mode and the augmented reality mode can be achieved by attaching the shading member 40 to and detaching the shading member 40 from the wearable apparatus. In these embodiments, the shading member 40 also functions as the adjusting device.

The shading member 40 may be attached to the housing body 50 of the wearable apparatus by snapping, docking, threading etc. Various manners of connection can be employed, and the present disclosure is not limited to those described above.

The wearable apparatus including the detachable shading member 40 may have a simpler structure and a lower cost, and may also adjust the quantity of the external light incident into the inside of the wearable apparatus. In some embodiments, an opening may be provided on the housing body 50 in the front of the user's sight. The shading member 40 may be detachably configured at the opening. In some embodiments, the shading member 40 may include a main body and a supporting component (not shown) for ensuring the integrity of the entire apparatus. The supporting component may comprise a transparent glass plate or another transparent material. The supporting component and the main body of the shading member 40 may be arranged in a stacked manner. The supporting component may be secured to the housing body 50 of the wearable apparatus, forming a side wall of the housing body 50. When the external light needs to be blocked, the main body of the shading member 40 can be placed on the inside of the housing body 50 of the wearable apparatus and arranged in a stack with the supporting component. When the external light needs to be allowed to pass, the main body of the shading member 40 can be removed from the housing body 50 of the wearable apparatus. As such, a pleasant appearance and a proper protection of the internal parts of the wearable apparatus can be ensured.

In some embodiments, the first eyepiece 30a may be configured between the first display screen 10a and the first optical mirror 20a. The second eyepiece 30b may be configured between the second display screen 20b and the second optical mirror 20b. Each of the first eyepiece 30a and the second eyepiece 30b may comprise a lens set including at least one convex lens and at least one concave lens. The object image projected by the first display screen 10a via the first optical mirror 20a may be approximately perpendicular to the optical axis of the first eyepiece 30a. The object image projected by the second display screen 10b via the second optical mirror 20b can be approximately perpendicular to the optical axis of the second eyepiece 30b.

Those skilled in the art would understand that in an optical system, the eyepiece is generally an optical element for magnifying an image produced by an objective lens. Thus, the images viewed by a user through the first eyepiece 30a and the second eyepiece 30b may be magnified. In some embodiments, both the first eyepiece 30a and the second eyepiece 30b may include a lens set including at least one convex lens and at least one concave lens. The convex lens may further magnify the image, widen the field of view, and enhance the sense of immersion. The concave lens may limit the field of view and allow a certain range of light to pass through the lens set.

When using the wearable apparatus, the user can look through the first eyepiece 30a with the user's left eye, and can look through the second eyepiece 30b with the user's right eye. The display plane 11a of the first display screen 10a may be parallel to the optical axis of the first eyepiece 30a, and hence may be parallel to the optical axis of the user's left eye. The display plane 11b of the second display screen 10b may be parallel to the optical axis of the second eyepiece 30b, and hence may be parallel to the optical axis of the use's right eye. The object images projected by the first display screen 10a and the second display screen 10b via the first optical mirror 20a and the second optical mirror 20b may be approximately perpendicular to the optical axes of the first eyepiece 30a and the second eyepiece 30b, respectively. As a result, the distances between various points on the object image and the eyepiece can be the same, thereby preventing the object images from deforming into trapezoids to deteriorate viewing effect. The first predetermined angle, $\alpha$, between the first display screen 10a and the first optical mirror 20a, and the second predetermined angle, $\beta$, between the second display screen 10b and the second optical mirror 20b may determine whether the object images—formed by reflection of the first display screen 10a and the second display screen 10b via the optical mirrors, respectively—are perpendicular to the optical axes of the first eyepiece 30a and the second eyepiece 30b.

In some embodiments, the first eyepiece 30a and the second eyepiece 30b may each include a lens set including at least one convex lens and at least one concave lens. Thus, the object images, formed by reflection of the contents displayed on the first display screen 10a and the second display 10b by the first optical mirror 20a and the second optical mirror 20b, may be virtual images.

Consistent with the disclosure, the wearable apparatus may display contents using two display screens (the first display screen 10a and the second display screen 10b), and may project the displayed contents into the user's left and right eyes via the first optical mirror 20a and the second optical mirror 20b. Compared to the existing technology, the effective monocular visual field consistent with the disclosure can reach 5.5 inches, with a resolution of 2560×1440. The field of view can reach approximately 45° without eyepieces disposed in the wearable apparatus. If eyepieces with a 1.5-time magnification are added, the field of view can further reach 70°. Therefore, a strong sense of immersion can be provided. Due to the increased effective monocular visual field, the magnification of the eyepieces does not have to be very high to achieve a good sense of immersion. Therefore, the grain effect experienced by the user can be reduced, and the display quality can be more delicate. For a helmet, an even better display quality can be obtained by utilizing display screens of a larger size and a higher resolution.

In some embodiments, the first display screen 10a and the second display screen 10b may be arranged to face each other and be parallel to each other. For example, as shown in FIG. 1 and FIG. 2, a predetermined distance is formed between the first display screen 10a and the second display screen 10b. The first optical mirror 20a, the second optical mirror 20b, the first eyepiece 30a and the second eyepiece 30b are positioned between the first display screen 10a and the second display screen 10b. The relative position between the first display screen 10a and the second display screen 10b may be determined according to the width of user's face or head, such that when the wearable apparatus is in use the first display screen 10a and the second display screen 10b may be positioned approximately parallel to each other and on the two sides of the user's eyes, respectively. Therefore, a more pleasurable viewing experience may be provided to the user, and in the more space may be saved to ensure that the entire structure of the wearable apparatus is compact.

In some embodiments, the first display screen 10a and the second display screen 10b may be placed closely against each other. In other words, the display plane 11a of the first display screen 10a and the display plane 11b of the second display screen 10b may face away from each other. Consequently, the reflective surface 21a of the first optical mirror 20a may face the display plane 11a of the first display screen 10a, and the reflective surface 21b of the second optical mirror 20b may face the display plane 11b of the second display screen 10b. In this manner, the first display screen 10a and the second display screen 10b can be disposed in the middle between the user's two eyes. When the wearable apparatus is being worn by the user, the first display screen 10a and the second display screen 10b can be mounted in front of the user's nose bridge. The first display screen 10a and the second display screen 10b may each include an ultra-thin display screen to prevent the user's sight from being blocked, thereby ensuring a comfortable viewing experience.

In some embodiments, the first predetermined angle $\alpha$ may be equal to the second predetermined angle $\beta$. Because the optical axis of the first eyepiece 30a may be nearly parallel to the optical axis of the second eyepiece 30b, the first display screen 10a may also be nearly parallel to the second display screen 10b, the first predetermined angle $\alpha$ may be approximately equal to the second predetermined angle $\beta$, and the first optical mirror 20a and the second optical mirror 20b may be arranged symmetrically with respect to the symmetry axis between the first eyepiece 30a and the second eyepiece 30b. Hence, the first optical mirror 20a and the second optical mirror 20b may roughly form the two legs (sides of equal lengths) of an isosceles triangle.

In some embodiments, each of the first predetermined angle $\alpha$ and the second predetermined angle $\beta$ may be 45°, thus allowing the object image projected by the first display screen 10a via the first optical mirror 20a to be perpendicular to the optical axis of the first eyepiece 30a, and allowing the object image projected by the second display screen 10b via the second optical mirror 20b to be perpendicular to the optical axis of the second eyepiece 30b. Those skilled in the art would understand that in the practical design of the wearable apparatus, the predetermined angle $\alpha$ and the second predetermined angle $\beta$ may vary within an allowable range of the error criterion. For example, the allowable range of the first predetermined angle $\alpha$ and the second predetermined angle $\beta$ may be 45°±5°. When the first predetermined angle $\alpha$ and the second predetermined angle $\beta$ are set as approximately 45°, the object images projected by the first display screen 10a and the second display screen 10b via the first optical mirror 20a and the second optical mirror 20b may be approximately perpendicular to the optical axes of the first eyepiece 30a and the second eyepiece 30b, respectively. Thus, the user can see the object images right in front. The user experience can be better.

Consistent with some embodiments of the disclosure, the wearable apparatus may further include an interpupillary distance adjustment system, which may be coupled to the first eyepiece 30a and the second eyepiece 30b. The interpupillary distance adjustment system may alter the distance between the first eyepiece 30a and the second eyepiece 30b by driving the first eyepiece 30a and/or the second eyepiece 30b to move towards or away from each other. Because different users may have different interpupillary distances, the wearable apparatus with the interpupillary distance adjustment system may accommodate different users. The first eyepiece 30a and the second eyepiece 30b may be configured to be movable on the housing body 50 of the wearable apparatus, thus ensuring that the distance between the first eyepiece 30a and the second eyepiece 30b may be changeable.

The interpupillary distance adjustment system may be a manual adjustment system. For example, the first eyepiece 30a and the second eyepiece 30b may be configured to be movable via a guide rail coupled to the housing body 50 of the wearable apparatus. The first eyepiece 30a and the second eyepiece 30b may be connected with a connecting rod and the user may operate the connecting rod to adjust the position of the first eyepiece 30a and/or the position of the second eyepiece 30b. In some other embodiments, the movable first eyepiece 30a and the second eyepiece 30b may be driven by a threaded rod engaged to two threaded nuts at the eyepieces. The threaded rod may have two sections of threads with opposite revolutions. Each section of the threaded rod may be engaged with one threaded nut. The two threaded nuts may be coupled to the first eyepiece 30a and the second eyepiece 30b, respectively. The user may rotate the threaded rod to drive the two threaded nuts, corresponding to the first eyepiece 30a and the second eyepiece 30b respectively, to move towards or away from each other along the threaded rod, thereby driving the first eyepiece 30a and the second eyepiece 30b to move towards or away from each other. Accordingly, the interpupillary distance can be manually adjusted. The distance between the first eyepiece 30a and the second eyepiece 30b can be adjusted according to one of other manners, which are not described here. Persons skilled in the art may design the adjustment system according to actual needs, which are not described here.

In some embodiments, the interpupillary distance may be adjusted automatically. For example, the wearable apparatus can include an interpupillary distance measurement device configured at the housing body 50 of the wearable apparatus. The interpupillary distance adjustment system may alter the distance between the first eyepiece 30a and the second eyepiece 30b according to the interpupillary distance measured by the interpupillary distance measurement device. Thus, the adjustment of the interpupillary distance can be more accurate.

As shown in FIG. 7, the interpupillary distance adjustment system may include a servo motor controller 60, a servo motor 70, and a transmission device 80. The servo motor controller 60 may be used to control the rotation angle of the output shaft of the servo motor 70. The transmission device 80 may be used to convert the rotational motion into a linear motion. The servo motor 70 may be connected to an input terminal of the transmission device 80. An output terminal of the transmission device 80 may be connected to the first eyepiece 30a and the second eyepiece 30b.

In some embodiments, the servo motor 70 may include a micro servo motor for fitting into a compact wearable apparatus such as eyeglasses and a helmet. The transmission device 80 may comprise an assembly of threaded rod and nuts described above. The output shaft of the servo motor 70 may be coupled to the threaded rod, for example, by a coupling. The servo motor controller 60 may receive the interpupillary distance data measured by the interpupillary distance measurement device and may control the operation of the servo motor 70. In some other embodiments, the servo motor controller 60 may receive a trigger signal from the user and may initiate a start or stop of the servo motor 70 according to the received trigger signal, thus controlling the start or stop of movement of the first earpiece 30a and the second earpiece 30b. As such, the interpupillary distance may be precisely adjusted by altering the distance between the first eyepiece 30a and the second eyepiece 30b via the servo motor 70.

In some embodiments, when the interpupillary distance is being adjusted, the images on the first display screen 10a and the second display screen 10b may be synchronously translated according to the distance between the first eyepiece 30a and the second eyepiece 30b, thus allowing the center of each of the user's eyes, the center of the corresponding eyepiece, and the center of the corresponding image to align in a line. As a result, the viewing comfort can be enhanced.

Referring to FIG. 4 or FIG. 5, the wearable apparatus consistent with the disclosure may include the display screen 10, the optical mirror 20, the shading member 40 and the adjusting device. The number of each of the display screen 10 and the optical mirror 20 may be one. A reflective surface 21 may be formed on the optical mirror 20. A predetermined angle, γ, may be formed between the display plane 11 of the display screen 10 and the reflective surface 21 of the optical mirror 20. The optical mirror 20 may be semi-transmissive/ semi-reflective. The adjusting device may be used to control the quantity of the external light transmitting through the shading member 40 and entering into the wearable apparatus.

In some embodiments, the display screen 10 may be obliquely placed in the housing body 50 of the wearable apparatus. When the wearable apparatus is in use, the display screen 10 may be placed in the front of the user's eyes. The display screen 10 may include a monitor having a display function, and the physical shape and structure of the display screen are not limited here. For example, the display screen 10 may include an LCD or an OLED. The display screen 10 may be of a type other than LCD and OLED. The images on the display screen 10 may be reflected by the optical mirror 20 into the user's eyes, thus allowing the user to see the contents on the display screen 10.

In some embodiments, the optical mirror 20 may be semi-transmissive/semi reflective and the quantity of the external light transmitting through the optical mirror 20 may be controlled by the adjusting device. When the adjusting device completely blocks the external light, i.e., the quantity of the external light entering into the wearable apparatus is zero, there may be no external light transmitting through the optical mirror 20 into the user's eyes. As a result, the user cannot see the exterior scene and thus can immerse in the virtual scene projected by the display screen 10 via the optical mirror 20, respectively. That is, the wearable apparatus works in the virtual reality mode. When the adjusting device allows the external light to enter the wearable apparatus (i.e., the passing quantity of the external light is not zero), for example, the external light may be completely incident onto the optical mirror 20 without obstruction. As a result, the external light may transmit into the user's eyes through the semi-transmissive/semi-reflective optical mirror 20. In the meantime, the contents on the display screen 10 can be projected as object images via the optical mirror 20 into the user's eyes. The object images may be superimposed on the real-world scene to allow the user to see both at the same time. That is, the wearable apparatus works in the augmented reality mode.

In some embodiments, the wearable apparatus may include a light-transmissive area that allows the user to see the scene in the front. When the light enters the wearable apparatus from the light-transmissive area and passes through the optical mirror 20 into the user's eyes, the user can see the exterior real-world scene. Switching between the virtual reality mode and the augmented mode may require blocking the external light or allowing the external light to pass through the light-transmissive area into the user's eyes. In some embodiments, the adjusting device can be used to control whether the external light can pass through the light-transmissive area. Once the light passes through the light-transmissive area, the light may transmit through the optical mirror 20 into the user's eyes. Hence, the adjusting device can be used to adjust the quantity of the external light transmitting into the optical mirror 20.

In some embodiments, the optical mirror 20 may be a semi-transmissive/semi-reflective mirror. A semi-transmissive/semi-reflective mirror refers to a mirror that can reflect a portion of incident light and transmit a portion of the incident light, and can include a piece of glass or a piece of organic glass. For example, a semi-transmissive/semi-reflective film may be coated on the reflective surface of the optical mirror. In some embodiments, for example, the optical mirror 20 may have a transmittance of 30% and a reflectance of 70%. The superimposition effect (i.e., the display quality of the augmented reality mode) may be determined by the ratio of the transmittance to the reflectance of the optical mirror 20.

In the augmented reality mode, the effect of the superimposition of the contents on the display screen and the exterior real-world scene may depend on light transmittances of the optical mirror 20, the illumination of the exterior environment, and the brightness of the display screen 10. The brightness of the display screen 10 may be automatically adjusted according to the change in the illumination of the exterior environment. The user may also be able to manually adjust the brightness of the display screen 10. Hence, a stable superimposition effect can be achieved in different scenes and user's experience of augmented reality can be improved.

The wearable apparatus can include one or more cameras. The display screen 10 may be electrically coupled with the one or more cameras, and may display contents that match the images captured by the one or more cameras. In some embodiments, the wearable apparatus can further include a processor. The one or more cameras may capture the user's gesture and the processor may execute an operation corresponding to the captured gesture. The one or more cameras may capture a current real scene. The processor may generate related information to match the current real scene captured by the one or more cameras, and control the display screen 10 to display the contents related to the current real scene. For example, the wearable apparatus may be used to perform pedestrian detection, face recognition, two-dimensional code recognition, etc. In the augmented reality mode, a user wearing the wearable apparatus may see the contents displayed on the display screens and the current exterior real-world scene. Because the superimposed images are virtual images, user can only see the contents displayed on the display screens but may not be able to physically touch the display screens. The one or more cameras may capture the position where the user taps or clicks on the virtual image. For example, when the user taps or clicks on an option menu in the virtual image, the one or more cameras may capture the image containing the user's tapping operation and, if the user's finger remains at a position for a certain period of time, detect the coordinate of the user's finger. By comparing the coordinate of the user's finger with the option menu in the image, the processor can determine a control command corresponding to the tapped option, perform a corresponding operation, and display an image corresponding to the tapped option on the screens. In some embodiments, the gesture for the selection operation can include, e.g., one or more of finger tapping, finger clicking, finger sliding, and frame selection, which is not limited in the present disclosure.

In some embodiments, the wearable apparatus can include one camera that can perform multiple functions, such as pedestrian detection, face recognition, two-dimensional code recognition, and finger coordinate detection. In some other embodiments, the wearable apparatus can include more than one camera that can capture different images for performing the multiple functions. Hence, the number of the one or more cameras is not limited in the present disclosure, and those skilled in the art may determine the number according to actual needs.

In some embodiments, the wearable apparatus can be used in connection with an unmanned aerial vehicle (UAV). When a user wearing the wearable apparatus is operating the UAV, the user can observe the actual flying status of the UAV within the range of sight and at the same time see the flying related information such as text, image, and/or video content. For example, information such as flying status, flying direction, flying trajectory, obstacle information, operation instruction, and video and image in the first-person view may be visually displayed by the wearable apparatus. There can be more application scenarios than those listed here.

According to the existing technologies, either the virtual reality mode or the augmented reality mode may be provided in a wearable apparatus, but the virtual reality mode and the augmented reality mode cannot be both provided in a single wearable apparatus, let alone the switching between the two modes. The wearable apparatus can be, e.g., eyeglasses or a helmet, which is not limited in the present disclosure. The wearable apparatus consistent with the disclosure may have a simple structure and a compact volume by using a single display screen 10. The contents on the display screen 10 may enter the user's left and right eyes through reflection by the optical mirror 20. Because the optical mirror 20 can be semi-transmissive/semi-reflective and the adjusting device can control the quantity of the external light transmitting through the shading member 40 into the wearable apparatus, the wearable apparatus can integrate virtual reality and augmented reality into one system by means of the adjusting device, and can also switch between the virtual reality mode and the augmented reality mode.

In some embodiments, the adjusting device may further include a shading member 40, which may face the other surface that is opposite to the reflective surface 21 of the optical mirror 20. The shading member 40 may be used to block the external light from being incident onto the optical mirror 20.

The wearable apparatus further includes a housing body 50, which can, for example, have a boxlike structure, as shown in FIG. 4. The shading member 40 may have a thin plate structure or another structure. The external light needs to first passes through the shading member 40 before being incident onto the other surface of the optical mirror 20 that is opposite to the reflective surface 21. Hence, when the external light is blocked by the shading member 40, the user cannot see the real-world scene and thus can immerse in the virtual scene under the virtual reality mode. The structures of the housing body 50 and the shading member 40 are not limited to those described above. Persons skilled in the art may devise different feasible structures according to actual needs, which are not described here.

Consistent with the disclosure, the shading member 40 may control the quantity of the external light entering into the optical mirror 20, thus realizing the switching between the virtual reality mode and the augmented reality mode.

In some embodiments, the shading member 40 may have a variable light transmittance and may be electrically coupled with the adjusting device (not shown). The adjusting device may be used to adjust a voltage applied to the shading member 40 for changing the light transmittance of the shading member 40. In some embodiments, the shading member 40 may include a liquid crystal display (LCD) screen. In some other embodiments, the shading member 40 may include another type of transmittance-variable device, such as a twisted nematic LCD (TN LCD) screen or a piece of electrochromic glass. Liquid crystal is an organic compound composed of rod-shaped molecules. In the natural state, the long axes of the rod-shaped molecules are roughly parallel to each other. Voltage applied to the LCD screen can be adjusted to vary the alignment of the liquid crystal molecules, resulting in the light transmitting and light blocking. The shading member 40 may operate in two states—a transparent state and a shading state—by controlling the voltage applied thereto. In the transparent state, the light transmittance may be, e.g., approximately 10%. In the shading state, the external light may be completely blocked by the shading member 40 and the light transmittance may be close to 0%. When the shading member 40 is in the transparent state, the wearable apparatus can work in the augmented reality mode and thus user may see the exterior real-world scene. On the other hand, when the shading member 40 is in the shading state, the wearable apparatus can work in the virtual reality mode and thus the user cannot see the exterior real-world scene and can only see the contents on the display screen.

In some embodiments, the angle between the display screen 10 and the shading member 40 can be set to equal the predetermined angle between the display screen 10 and the optical mirror 20 for a good shading performance.

The wearable apparatus consistent with the disclosure may operate in both the virtual reality mode and the augmented reality mode. The light transmittance of the shading member 40 can be adjusted to control whether the external light can enter the wearable apparatus. In some embodiments, the shading member 40 can be completely opaque if the voltage of a predetermined value is applied to the shading member 40 or if no voltage is applied to the shading member 40, and the wearable apparatus may operate in the virtual reality mode. On the other hand, the shading member 40 can be transparent if the voltage of another predetermined value is applied to the shading member 40, allowing the external light to enter the wearable apparatus and the user to see the exterior real-world scene, and the wearable apparatus may operate in the augmented reality mode.

In some embodiments, the shading member 40 may be configured to be detachable from the housing body 50 of the wearable apparatus. In these embodiments, the shading member 40 may include a common opaque material, such as a plastic plate or a wood board. In some embodiments, the weight of the shading member 40 may be light, such that the total weight of the entire wearable apparatus can be reduced and the comfort to wear the wearable apparatus can be enhanced. In these embodiments, switching between the virtual reality mode and the augmented reality mode can be achieved by attaching the shading member 40 to and detaching the shading member 40 from the wearable apparatus. In these embodiments, the shading member 40 also functions as the adjusting device.

The shading member 40 may be attached to the housing body 50 of the wearable apparatus by snapping, docking, threading etc. Various manners of connection can be employed, and the present disclosure is not limited to those described above.

The wearable apparatus including the detachable shading member 40 may have a simpler structure and a lower cost, and may also adjust the quantity of the external light incident into the inside of the wearable apparatus. In some embodiments, an opening may be provided on the housing body 50 in the front of the user's sight. The shading member 40 may be detachably configured at the opening. In some embodiments, the shading member 40 may include a main body and a supporting component (not shown) for ensuring the integrity of the entire apparatus. The supporting component may comprise a transparent glass plate or another transparent material. The supporting component and the main body of the shading member 40 may be arranged in a stacked manner. The supporting component may be secured to the housing body 50 of the wearable apparatus, forming a side wall of the housing body 50. When the external light needs to be blocked, the main body of the shading member 40 can be placed on the inside of the housing body 50 of the wearable apparatus and arranged in a stack with the supporting component. When the external light needs to be allowed to pass, the main body of the shading member 40 can be removed from the housing body 50 of the wearable apparatus. As such, a pleasant appearance and a proper protection of the internal parts of the wearable apparatus can be ensured.

In some embodiments, the wearable apparatus may further include a first eyepiece 30a and a second eyepiece 30b. The first eyepiece 30a and the second eyepiece 30b may be configured between the display plane 11 of the display screen 10 and the reflective surface 21 of the optical mirror 20. Each of the first eyepiece 30a and the second eyepiece 30b may include a lens set, including at least one convex lens and at least one concave lens.

Persons skilled in the art would understand that in an optical system, the eyepiece is generally an optical element for magnifying an image produced by an objective lens. Thus, the images viewed by a user through the first eyepiece 30a and the second eyepiece 30b may be magnified. In some embodiments, both the first eyepiece 30a and the second eyepiece 30b may include a lens set including at least one convex lens and at least one concave lens. The convex lens may further magnify the image, widen the field of view, and enhance the sense of immersion. The concave lens may limit the field of view and allow a certain range of light to pass through the lens set.

When using the wearable apparatus, the user can look through the first eyepiece 30a with the user's left eye, and can look through the second eyepiece 30b with the user's right eye. An angle may be formed between the display plane 11 of the display screen 10 and the optical axis of the first eyepiece 30a. The object image projected by the display screen 10 via the optical mirror 20 may be approximately perpendicular to the optical axes of the first eyepiece 30a and the second eyepiece 30b. As a result, the distances between various points on the object image and the eyepiece may be the same, thereby preventing the object images from deforming into trapezium to deteriorate viewing effect. The predetermined angle $\gamma$ between the display screen 10 and the optical mirror 20 may determine whether the object image formed by reflection of the display screen 10 via the optical mirror 20 can be approximately perpendicular to the optical axes of the first eyepiece 30a and the second eyepiece 30b.

In some embodiments, each of the first eyepiece 30a and the second eyepiece 30b may include a lens set including at least one convex lens and at least one concave lens. Thus, the object images, formed by reflection of the contents on the display screen 10 via the optical mirror 20, may be virtual images.

In some embodiments, the wearable apparatus may further include an interpupillary distance adjustment system, which may be coupled to the first eyepiece 30a and the second eyepiece 30b. The interpupillary distance adjustment system may alter the distance between the first eyepiece 30a and the second eyepiece 30b by driving the first eyepiece 30a and/or the second eyepiece 30b to move towards or away from each other. Because different users may have different interpupillary distances, the wearable apparatus with the interpupillary distance adjustment system may accommodate different users. The first eyepiece 30a and the second eyepiece 30b may be configured to be movable on the housing body 50 of the wearable apparatus, thus ensuring that the distance between the first eyepiece 30a and the second eyepiece 30b may be changeable.

The interpupillary distance adjustment system may be a manual adjustment system. For example, the first eyepiece 30a and the second eyepiece 30b may be configured to be movable via a guide rail coupled to the housing body 50 of the wearable apparatus. The first eyepiece 30a and the second eyepiece 30b may be connected with a connecting rod and the user may operate the connecting rod to adjust the position of the first eyepiece 30a and/or the position of the second eyepiece 30b. In some other embodiments, the movable first eyepiece 30a and the second eyepiece 30b may be driven by a threaded rod engaged to two threaded nuts at the eyepieces. The threaded rod may have two sections of threads with opposite revolutions. Each section of the threaded rod may be engaged with one threaded nut. The two threaded nuts may be coupled to the first eyepiece 30a and the second eyepiece 30b, respectively. The user may rotate the threaded rod to drive the two threaded nuts, corresponding to the first eyepiece 30a and the second eyepiece 30b respectively, to move towards or away from each other along the threaded rod, thereby driving the first eyepiece 30a and the second eyepiece 30b to move towards or away from each other. Accordingly, the interpupillary distance can be manually adjusted. The distance between the first eyepiece 30a and the second eyepiece 30b can be adjusted according to one of other manners, which are not described here. Persons skilled in the art may design the adjustment system according to actual needs, which are not described here.

In some embodiments, the interpupillary distance may be adjusted automatically. For example, the wearable apparatus can include an interpupillary distance measurement device configured at the housing body 50 of the wearable apparatus. The interpupillary distance adjustment system may alter the distance between the first eyepiece 30a and the second eyepiece 30b according to the interpupillary distance measured by the interpupillary distance measurement device. Thus, the adjustment of the interpupillary distance can be more accurate.

As shown in FIG. 7, the interpupillary distance adjustment system may include a servo motor controller 60, a servo motor 70, and a transmission device 80. The servo motor controller 60 may be used to control the rotation angle of the output shaft of the servo motor 70. The transmission device 80 may be used to convert the rotational motion into a linear motion. The servo motor 70 may be connected to an input terminal of the transmission device 80. An output terminal of the transmission device 80 may be connected to the first eyepiece 30a and the second eyepiece 30b.

In some embodiments, the servo motor 70 may include a micro servo motor for fitting into a compact wearable apparatus such as eyeglasses and a helmet. The transmission device 80 may comprise an assembly of threaded rod and nuts described above. The output shaft of the servo motor 70 may be coupled to the threaded rod, for example, by a coupling. The servo motor controller 60 may receive the interpupillary distance data measured by the interpupillary distance measurement device and may control the operation of the servo motor 70. In some other embodiments, the servo motor controller 60 may receive a trigger signal from the user and may initiate a start or stop of the servo motor 70 according to the received trigger signal, thus controlling the start or stop of movement of the first earpiece 30a and the second earpiece 30b. As such, the interpupillary distance may be precisely adjusted by altering the distance between the first eyepiece 30a and the second eyepiece 30b via the servo motor 70.

In some embodiments, when the interpupillary distance is being adjusted, the images on the display screen 10 may be synchronously translated according to the distance between the first eyepiece 30a and the second eyepiece 30b, thus allowing the center of each of the user's eyes, the center of the corresponding eyepiece, and the center of the corresponding image to align in a line. As a result, the viewing comfort can be enhanced.

Figure 6:
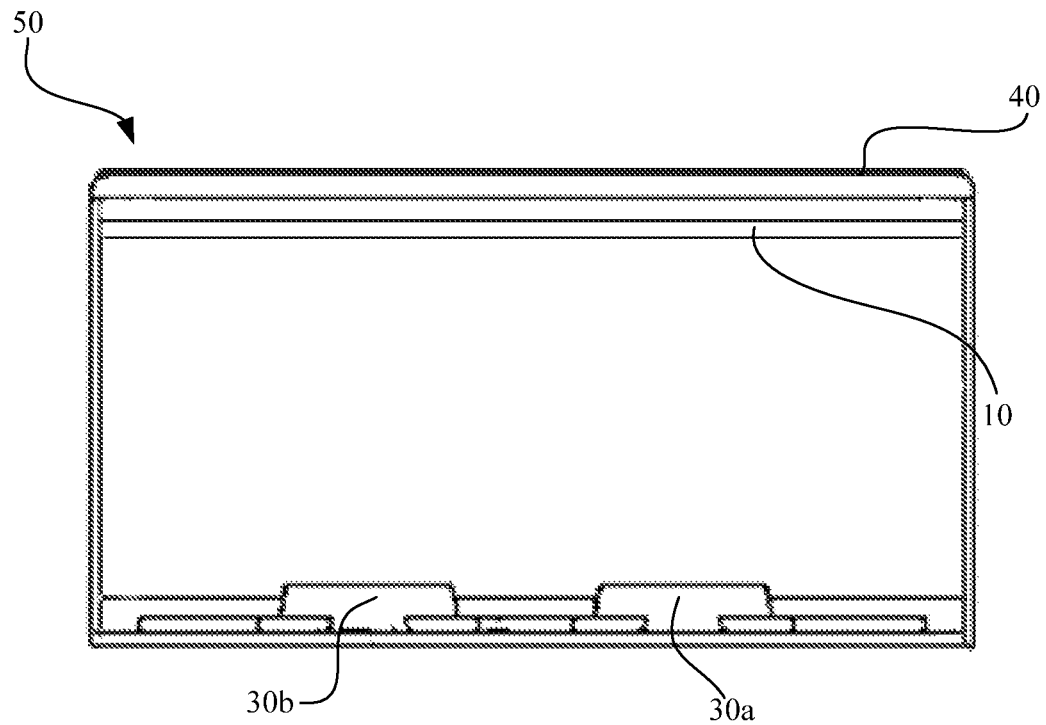
FIG. 6 is a schematic structural diagram of a wearable apparatus according to another example embodiment.

FIG. 6 is a schematic structural diagram of a wearable apparatus according to another embodiment. As shown in FIG. 6, the wearable apparatus includes a display screen 10, a first eyepiece 30a, a second eyepiece 30b, a shading member 40 and an adjusting device. The display screen 10 may be approximately perpendicular to the optical axes of the first eyepiece 30a and the second eyepiece 30b. The display screen 10 may be light transmissive. The adjusting device may be used to adjust the quantity of the external light transmitting through the shading member 40 into the wearable apparatus.

In some embodiments, as shown in FIG. 6, the wearable apparatus further includes a housing body 50. The housing body 50 of the wearable apparatus may form a closed space where the display screen 10 can be placed. The display plane 11 of the display screen 10 may be parallelly disposed in the front of the user's eyes, such that the user can directly see the contents on the display screen 10. In some embodiments, the display screen 10 may include a monitor having a display function. The physical shape and structure of the display screen 10 are limited. For example, the display screen 10 may include an LCD or an OLED. The display screen may be of a type other than LCD and OLED. The display screen 10 consistent with the disclosure may be semi-transmissive/semi-reflective. In some embodiments, the display screen 10 may include a transparent display screen. A transparent display screen refers to a display screen with a transparent surface under the normal condition, which allows the user to view the displayed image while still being able to see through the screen. When the adjusting device causes the external light to be completely blocked, i.e., the quantity of the external light transmitting through the display screen 10 and entering the wearable apparatus is zero, there may be no external light entering the user's eyes, and hence the user can only see the contents on the display screen 10. That is, the wearable apparatus works in the virtual reality mode. When the adjusting device allows at least a portion of the external light to enter the wearable apparatus (i.e., the passing quantity of the external light is not zero), the user may see both the contents on the display screen 10 and the exterior real-world scene. That is, the wearable apparatus works in the augmented reality mode.

According to the existing technologies, either the virtual reality mode or the augmented reality mode may be provided in a wearable apparatus, but the virtual reality mode and the augmented reality mode cannot be both provided in a single wearable apparatus, let alone the switching between the two modes. In some embodiments, the wearable apparatus may include the light-transmissive display screen 10 that can be placed right in the front of the user. As such, the user can see both the contents on the display screen 10 and the exterior real-world scene, thereby experiencing augmented reality. In some other embodiments, the adjusting device may adjust the quantity of the external light transmitting through the display screen 10 to control whether the external light can enter the user's eyes via the display screen 10. For example, when the adjusting device completely blocks the external light from entering the user's eyes, the wearable apparatus works in the virtual reality mode.

According to some embodiments of the disclosure, the wearable apparatus can integrate both virtual reality and augmented reality into one system, and can also switch between the virtual reality mode and the augmented reality mode.

In some embodiments, the shading member 40 may be further set to be parallel to the display screen 10. The shading member 40 may have a thin plate structure or another structure. The shading member 40 can be used to block the external light of the real-world scene from entering into display screen 10. The external light needs to first transmit through the display screen 10 before reaching the user's eyes. If the shading member 40 blocks the external light, the user will not see the real-world scene and thus can immerse in the virtual scene under the virtual reality mode. The structures of the housing body 50 and the shading member 40 may not be limited to those described above. Persons skilled in the art may devise different feasible structures according to actual needs, which may not be described here.

In some embodiments, the shading member 40 may have a variable light transmittance and may be electrically coupled with the adjusting device (not shown). The adjusting device may be used to adjust a voltage applied to the shading member 40 for changing the light transmittance of the shading member 40. In some embodiments, the shading member 40 may include a liquid crystal display (LCD) screen. In some other embodiments, the shading member 40 may include another type of transmittance-variable device, such as a twisted nematic LCD (TN LCD) screen or a piece of electrochromic glass. Liquid crystal is an organic compound composed of rod-shaped molecules. In the natural state, the long axes of the rod-shaped molecules are roughly parallel to each other. Voltage applied to the LCD screen can be adjusteded to vary the alignment of the liquid crystal molecules, resulting in the light transmitting and light blocking. The shading member 40 may operate in two states—a transparent state and a shading state—by controlling the voltage applied thereto. In the transparent state, the light transmittance may be, e.g., approximately 10%. In the shading state, the external light may be completely blocked by the shading member 40 and the light transmittance may be close to 0%. When the shading member 40 is in the transparent state, the wearable apparatus can work in the augmented reality mode and thus user may see the exterior real-world scene. On the other hand, when the shading member 40 is in the shading state, the wearable apparatus can work in the virtual reality mode and thus the user cannot see the exterior real-world scene and can only see the contents on the display screen 10.

The wearable apparatus consistent with the disclosure may operate in both the virtual reality mode and the augmented reality mode. The light transmittance of the shading member 40 can be adjusteded to control whether the external light can enter the wearable apparatus. In some embodiments, the shading member 40 can be completely opaque if the voltage of a predetermined value is applied to the shading member 40 or if no voltage is applied to the shading member 40, and the wearable apparatus may operate in the virtual reality mode. On the other hand, the shading member 40 can be transparent if the voltage of another predetermined value is applied to the shading member 40, allowing the external light to enter the wearable apparatus and the user to see the exterior real-world scene, and the wearable apparatus may operate in the augmented reality mode.

In some embodiments, the shading member 40 may be configured to be detachable from the housing body 50 of the wearable apparatus. In these embodiments, the shading member 40 may include a common opaque material, such as a plastic plate or a wood board. In some embodiments, the weight of the shading member 40 may be light, such that the total weight of the entire wearable apparatus can be reduced and the comfort to wear the wearable apparatus can be enhanced. In these embodiments, switching between the virtual reality mode and the augmented reality mode can be achieved by attaching the shading member 40 to and detaching the shading member 40 from the wearable apparatus. In these embodiments, the shading member 40 also functions as the adjusting device.

The shading member 40 may be attached to the housing body 50 of the wearable apparatus by snapping, docking, threading etc. Various manners of connection can be employed, and the present disclosure is not limited to those described above.

The wearable apparatus including the detachable shading member 40 may have a simpler structure and a lower cost, and may also adjust the quantity of the external light incident into the inside of the wearable apparatus. In some embodiments, an opening may be provided on the housing body 50 in the front of the user's sight. The shading member 40 may be detachably configured at the opening. In some embodiments, the shading member 40 may include a main body and a supporting component (not shown) for ensuring the integrity of the entire apparatus. The supporting component may comprise a transparent glass plate or another transparent material. The supporting component and the main body of the shading member 40 may be arranged in a stacked manner. The supporting component may be secured to the housing body 50 of the wearable apparatus, forming a side wall of the housing body 50. When the external light needs to be blocked, the main body of the shading member 40 can be placed on the inside of the housing body 50 of the wearable apparatus and arranged in a stack with the supporting component. When the external light needs to be allowed to pass, the main body of the shading member 40 can be removed from the housing body 50 of the wearable apparatus. As such, a pleasant appearance and a proper protection of the internal parts of the wearable apparatus can be ensured.

In some embodiments, the wearable apparatus may further include an interpupillary distance adjustment system, which may be coupled to the first eyepiece 30a and the second eyepiece 30b. The interpupillary distance adjustment system may alter the distance between the first eyepiece 30a and the second eyepiece 30b by driving the first eyepiece 30a and/or the second eyepiece 30b to move towards or away from each other. Because different users may have different interpupillary distances, the wearable apparatus with the interpupillary distance adjustment system may accommodate different users. The first eyepiece 30a and the second eyepiece 30b may be configured to be movable on the housing body 50 of the wearable apparatus, thus ensuring that the distance between the first eyepiece 30a and the second eyepiece 30b may be changeable.

The interpupillary distance adjustment system may be a manual adjustment system. For example, the first eyepiece 30a and the second eyepiece 30b may be configured to be movable via a guide rail coupled to the housing body 50 of the wearable apparatus. The first eyepiece 30a and the second eyepiece 30b may be connected with a connecting rod and the user may operate the connecting rod to adjust the position of the first eyepiece 30a and/or the position of the second eyepiece 30b. In some other embodiments, the movable first eyepiece 30a and the second eyepiece 30b may be driven by a threaded rod engaged to two threaded nuts at the eyepieces. The threaded rod may have two sections of threads with opposite revolutions. Each section of the threaded rod may be engaged with one threaded nut. The two threaded nuts may be coupled to the first eyepiece 30a and the second eyepiece 30b, respectively. The user may rotate the threaded rod to drive the two threaded nuts, corresponding to the first eyepiece 30a and the second eyepiece 30b respectively, to move towards or away from each other along the threaded rod, thereby driving the first eyepiece 30a and the second eyepiece 30b to move towards or away from each other. Accordingly, the interpupillary distance can be manually adjusted. The distance between the first eyepiece 30a and the second eyepiece 30b can be adjusted according to one of other manners, which are not described here. Persons skilled in the art may design the adjustment system according to actual needs, which are not described here.

In some embodiments, the interpupillary distance may be adjusted automatically. For example, the wearable apparatus can include an interpupillary distance measurement device configured at the housing body 50 of the wearable apparatus. The interpupillary distance adjustment system may alter the distance between the first eyepiece 30a and the second eyepiece 30b according to the interpupillary distance measured by the interpupillary distance measurement device. Thus, the adjustment of the interpupillary distance can be more accurate.

FIG. 7 is a schematic block diagram of an example interpupillary distance adjustment system consistent with the disclosure. As shown in FIG. 7, the interpupillary distance adjustment system includes a servo motor controller 60, a servo motor 70, and a transmission device 80. The servo motor controller 60 may be used to control the rotation angle of the output shaft of the servo motor 70. The transmission device 80 may be used to convert the rotational motion into a linear motion. The servo motor 70 may be connected to an input terminal of the transmission device 80. An output terminal of the transmission device 80 may be connected to the first eyepiece 30a and the second eyepiece 30b.

In some embodiments, the servo motor 70 may include a micro servo motor for fitting into a compact wearable apparatus such as eyeglasses and a helmet. The transmission device 80 may comprise an assembly of threaded rod and nuts described above. The output shaft of the servo motor 70 may be coupled to the threaded rod, for example, by a coupling. The servo motor controller 60 may receive the interpupillary distance data measured by the interpupillary distance measurement device and may control the operation of the servo motor 70. In some other embodiments, the servo motor controller 60 may receive a trigger signal from the user and may initiate a start or stop of the servo motor 70 according to the received trigger signal, thus controlling the start or stop of movement of the first earpiece 30a and the second earpiece 30b. As such, the interpupillary distance may be precisely adjusted by altering the distance between the first eyepiece 30a and the second eyepiece 30b via the servo motor 70.

In some embodiments, when the interpupillary distance is being adjusted, the images on the display screen 10 may be synchronously translated according to the distance between the first eyepiece 30a and the second eyepiece 30b, thus allowing the center of each of the user's eyes, the center of the corresponding eyepiece, and the center of the corresponding image to align in a line. As a result, the viewing comfort can be enhanced.

The present disclosure provides a UAV system. In some embodiments, the UAV system may include one or more cameras (not shown) that can capture images in the first-person view and can communicate with the wearable apparatus. Referring to FIG. 1 and FIG. 2, the wearable apparatus includes a first display screen 10a, a second display screen 10b, a first optical mirror 20a, a second optical mirror 20b, a first eyepiece 30a and a second eyepiece 30b. The first eyepiece 30a may be configured between the first display screen 10a and the first optical mirror 20a, and the second eyepiece 30b may be configured between the second display screen 10b and the second optical mirror 20b.

In some embodiments, the first display screen 10a may be parallel to the optical axis of the first eyepiece 30a, and the display plane 11b of the second display screen 10b may be parallel to the optical axis of the second eyepiece 30b.

Two reflective surfaces 21a and 21b are formed on the first optical mirror 20a and the second optical mirror 20b, respectively. The reflective surface 21a of the first optical mirror 20a faces the first display screen 10a and a first predetermined angle α is formed between the reflective surface 21a of the first optical mirror 20a and the first display screen 10a, such that an object image 101a projected by the first display screen 10a via the first optical mirror 20a is approximately perpendicular to the optical axis of the first eyepiece 30a. The reflective surface 21b of the second optical mirror 20b faces the second display screen 10b and a second predetermined angle β is formed between the reflective surface 21b of the second optical mirror 20b and the second display screen 10b. As a result, the object image (not shown) projected by the second display screen 10b via the second optical mirror 20b can be approximately perpendicular to the optical axis of the second eyepiece 30b.

In some embodiments, the reflective surface 21a of the first optical mirror 20a and the reflective surface 21b of the second optical mirror 20b may be coated with a reflective film or a semi-transmissive/semi-reflective film. For example, when the first optical mirror 20a and the second optical mirror 20b only need to reflect light, each of the reflective surfaces 21a, 21b may be coated with a reflective film. When the first optical mirror 20a and the second optical mirror 20b need to both reflect and transmit light, each of the reflective surface 21a of the first optical mirror 20a and the reflective surface 21b of the second optical mirror 20b may be coated with a semi-transmissive/semi-reflective film. For example, if the wearable apparatus is working in an augmented reality mode, the first optical mirror 20a and the second optical mirror 20b may need to be partially transmissive and partially reflective, and thus, the reflective surface 21a of the first optical mirror 20a and the reflective surface 21b of the second optical mirror 20b may each be coated with a semi-transmissive/semi-reflective film.

In these embodiments, the working principle, implementation method and connection of the wearable apparatus in the UAV system may be the same as those described in some embodiments above, which are not described here.

The UAV system consistent with the disclosure may use the camera to capture the images of the first-person view and may connect the camera with the wearable apparatus. Wearing the wearable apparatus having a superior sense of immersion, the user can experience a strong sense of immersion on the flying in the first-person view.

In some embodiments, the first display screen 10a and the second display screen 10b may be arranged to face each other and be parallel to each other. For example, as shown in FIG. 1 and FIG. 2, a predetermined distance is formed between the first display screen 10a and the second display screen 10*b*. The first optical mirror 20*a*, the second optical mirror 20*b*, the first eyepiece 30*a* and the second eyepiece 30*b* are positioned between the first display screen 10*a* and the second display screen 10*b*.

In these embodiments, the working principle, implementation method, and connection of the wearable apparatus in the UAV system may be the same as or similar to those in some of the embodiments described above, which are not described here.

The wearable apparatus in the UAV system consistent with the disclosure can ensure that the user has a good sense of immersion and the entire wearable apparatus has a smaller size.

In some embodiments, the first display screen 10*a* and the second display screen 10*b* of the wearable apparatus may be placed closely against each other. In other words, the display plane 11*a* of the first display screen 10*a* and the display plane 11*b* of the second display screen 10*b* may face away from each other. Consequently, the reflective surface 21*a* of the first optical mirror 20*a* may face the display plane 11*a* of the first display screen 10*a*, and the reflective surface 21*b* of the second optical mirror 20*b* may face the display plane 11*b* of the second display screen 10*b*. In this manner, the first display screen 10*a* and the second display screen 10*b* can be disposed in the middle between the user's two eyes. When the wearable apparatus is being worn by the user, the first display screen 10*a* and the second display screen 10*b* are mounted in front of the user's nose bridge. Each of the first display screen 10*a* and the second display screen 10*b* may include an ultra-thin display screen to prevent the user's sight from being blocked, thereby ensuring a comfortable viewing experience.

In some embodiments, the first predetermined angle α may be equal to the second predetermined angle β. Because the optical axis of the first eyepiece 30*a* may be nearly parallel to the optical axis of the second eyepiece 30*b*, the first display screen 10*a* may also be nearly parallel to the second display screen 10*b*, the first predetermined angle α may be approximately equal to the second predetermined angle β, and the first optical mirror 20*a* and the second optical mirror 20*b* may be arranged symmetrically with respect to the symmetry axis between the first eyepiece 30*a* and the second eyepiece 30*b*. Hence, the first optical mirror 20*a* and the second optical mirror 20*b* may roughly form the two legs (sides of equal lengths) of an isosceles triangle.

In these embodiments, the working principle, implementation method, and connection of the wearable apparatus in the UAV system may be the same as or similar to those in some of the embodiments described above, which are not described here.

The wearable apparatus in the UAV system consistent with the disclosure can ensure that the user has a good experience of viewing the object images displayed in the front perspective view.

In some embodiments, each of the first optical mirror 20*a* and the second optical mirror 20*b* may be partially transmissive and partially reflective. That is, each of the first optical mirror 20*a* and the second optical mirror 20*b* may be a semi-transmissive/semi-reflective mirror. A semi-transmissive/semi-reflective film may be coated on the reflective surface 21*a* of the first optical mirror 20*a* and the reflective surface 21*b* of the second optical mirror 20*b*.

The wearable apparatus can include one or more cameras. The first display screen 10*a* and the second display screen 10*b* may be electrically coupled with the one or more cameras, and may display contents that match the images captured by the one or more cameras. In some embodiments, the wearable apparatus can further include a processor. The camera may capture the user's gesture and the processor may execute an operation corresponding to the captured gesture. The one or more cameras may capture a current real scene. The processor may generate related information to match the current real scene captured by the one or more camera, and control the first display screen 10*a* and the second display screen 10*b* to display the contents related to the current real scene.

In these embodiments, the working principle, implementation method, and connection of the wearable apparatus in the UAV system may be the same as or similar to those in some of the embodiments described above, which are not described here.

In some embodiments, the wearable apparatus can be used in connection with an unmanned aerial vehicle (UAV). When a user wearing the wearable apparatus is operating the UAV, the user can observe the actual flying status of the UAV within the range of sight and at the same time see the flying related information such as text, image, and/or video content. For example, information such as flying status, flying direction, flying trajectory, obstacle information, operation instruction, and video and image in the first-person view may be visually displayed by the wearable apparatus. There can be more application scenarios than those listed here.

In some embodiments, the wearable apparatus may further include an adjusting device. The adjusting device can be used to adjust the quantity of the external light transmitting through the first optical mirror 20*a* and the second optical mirror 20*b*.

In these embodiments, the working principle, implementation method, and connection of the wearable apparatus in the UAV system may be the same as or similar to those in some of the embodiments described above, which are not described here.

The wearable apparatus in the UAV system consistent with the disclosure can integrate virtual reality and augmented reality into one system and can also switch between the virtual reality mode and the augmented reality mode. The user wearing the wearable apparatus to observe the UAV can switch between the two modes above and thus can have a rich experience with the simulated flight.

Referring again to FIG. 1 and FIG. 2, in some embodiments, the adjusting device further includes a shading member 40, which faces the other surface of the first optical mirror 20*a* that is opposite to the reflective surface 21*a* and the other surface of the second optical mirror 20*b* that is opposite to the reflective surface 21*b*. The shading member 40 may be used to block the external light from being incident onto the first optical mirror 20*a* and the second optical mirror 20*b*.

The wearable apparatus further includes a housing body 50, which can, for example, have a boxlike structure, as shown in FIG. 1. The shading member 40 may have a thin plate structure or another structure. The external light needs to first passes through the shading member 40 before being incident onto the other surface of the first optical mirror 20*a* that is opposite to the reflective surface 21*a* and onto the other surface of the second optical mirror 20*b* that is opposite to the reflective surface 21*b*. Hence, when the external light is blocked by the shading member 40, the user cannot see the real-world scene and thus may immerse in the virtual scene under the virtual reality mode. The structures of the housing body 50 and the shading member 40 are not limited to those described above. Persons skilled in the art may devise different feasible structures according to actual needs, which are not described here.

In some embodiments, the shading member 40 may have a variable light transmittance and may be electrically coupled with the adjusting device (not shown). The adjusting device may be used to adjust a voltage applied to the shading member 40 for changing the light transmittance of the shading member 40.

In some embodiments, the shading member 40 can be arranged perpendicular to the first display screen 10a and the second display screen 10b for a good shading performance.

In these embodiments, the working principle, implementation method, and connection of the wearable apparatus in the UAV system may be the same as or similar to those in some of the embodiments described above, which are not described here.

The wearable apparatus consistent with the disclosure may operate in both the virtual reality mode and the augmented reality mode. The light transmittance of the shading member 40 can be adjusted to control whether the external light can enter the wearable apparatus. In some embodiments, the shading member 40 can be completely opaque if the voltage of a predetermined value is applied to the shading member 40 or if no voltage is applied to the shading member 40, and the wearable apparatus can operate in the virtual reality mode. On the other hand, the shading member 40 can be transparent if the voltage of another predetermined value is applied to the shading member 40, allowing the user to really see the flying status of the UAV within the sight range, and the wearable apparatus can operate in the augmented reality mode.

In some embodiments, the shading member 40 may be configured to be detachable from the housing body 50 of the wearable apparatus.

In these embodiments, the working principle, implementation method and connection of the wearable apparatus in the UAV system may be the same as those described in some embodiments above, which are not described here.

In some embodiments, an opening may be provided on the housing body 50 in the front of the user's sight. The shading member 40 may be detachably configured at the opening. In some embodiments, the shading member 40 may include a main body and a supporting component (not shown) for ensuring the integrity of the entire apparatus. The supporting component may comprise a transparent glass plate or another transparent material. The supporting component and the main body of the shading member 40 may be arranged in a stacked manner. The supporting component may be secured to the housing body 50 of the wearable apparatus, forming a side wall of the housing body 50. When the external light needs to be blocked, the main body of the shading member 40 can be placed on the inside of the housing body 50 of the wearable apparatus and arranged in a stack with the supporting component. When the external light needs to be allowed to pass, the main body of the shading member 40 can be removed from the housing body 50 of the wearable apparatus. As such, a pleasant appearance and a proper protection of the internal parts of the wearable apparatus can be ensured.

The wearable apparatus in the UAV system consistent with the disclosure can have a simpler structure and a lower cost, and can also switch between the virtual reality mode and the augmented reality mode by installing or removing the detachable shading member 40.

In some embodiments, the wearable apparatus may further include an interpupillary distance adjustment system, which may be coupled to the first eyepiece 30a and the second eyepiece 30b. The interpupillary distance adjustment system may alter the distance between the first eyepiece 30a and the second eyepiece 30b by driving the first eyepiece 30a and/or the second eyepiece 30b to move towards or away from each other. Because different users may have different interpupillary distances, the wearable apparatus with the interpupillary distance adjustment system can accommodate different users.

In these embodiments, the working principle, implementation method, and connection of the wearable apparatus in the UAV system may be the same as or similar to those in some of the embodiments described above, which are not described here.

The wearable apparatus consistent with the disclosure can accommodate different users with different interpupillary distances, by adjusting the distance between the first eyepiece 30a and the second eyepiece 30b through the interpupillary distance adjustment system.

FIG. 7 is a schematic block diagram of an example interpupillary distance adjustment system consistent with the disclosure. As shown in FIG. 7, the interpupillary distance adjustment system includes a servo motor controller 60, a servo motor 70, and a transmission device 80. The servo motor controller 60 may be used to control the rotation angle of the output shaft of the servo motor 70. The transmission device 80 may be used to convert the rotational motion into a linear motion. The servo motor 70 may be connected to an input terminal of the transmission device 80. An output terminal of the transmission device 80 may be connected to the first eyepiece 30a and the second eyepiece 30b.

In some embodiments, when the interpupillary distance is being adjusted, the images on the first display screen 10a and the second display screen 10b may be synchronously translated according to the distance between the first eyepiece 30a and the second eyepiece 30b, thus allowing the center of each of the user's eyes, the center of the corresponding eyepiece, and the center of the corresponding image to align in a line. As a result, the viewing comfort can be enhanced.

In these embodiments, the working principle, implementation method, and connection of the wearable apparatus in the UAV system may be the same as or similar to those in some of the embodiments described above, which are not described here.

The wearable apparatus in the UAV system consistent with the disclosure can accurately adjust the interpupillary distance and thus can offer a better comfort of use.

In some embodiments, the UAV system may include one or more cameras that can capture the images in the first-person view (not shown) and can communicate with the wearable apparatus.

FIG. 4 is a schematic structural diagram of another example wearable apparatus consistent with the disclosure. FIG. 5 is a front view of the wearable apparatus shown in FIG. 4. The wearable apparatus may include a plurality of display screens, optical mirrors, a shading member, and an adjusting device. Each of the optical mirrors can have a reflective surface formed on the optical mirror. The display plane of a display screen and the reflective surface of the corresponding optical mirror. The optical mirrors can include semi-transmissive/semi-reflective optical mirrors. The adjusting device may be used to adjust the quantity of the external light passing through the shading member into the inside of the wearable apparatus. The wearable apparatus will be described in more detail in connection with FIGS. 1, 2, 4, and 5.

In some embodiments, as shown in FIG. 1 and FIG. 2, the number of the display screens may be two (the first display screen 10a and the second display screen 10b). Correspondingly, the number of the optical mirrors may also be two (the first optical mirror 20a and the second optical mirror 20b), which work in connection with the two display screens. A first predetermined angle α is formed between the reflective surface 21a of the first optical mirror 20a, and a second predetermined angle β is formed between the reflective surface 21b of the second optical mirror 20b and the second display screen 10b.

In some embodiments, the wearable apparatus may include one display screen and one optical mirror, such as the display screen 10 and the optical mirror 20 shown in FIG. 4 and FIG. 5. As shown in FIG. 4 and FIG. 5, the angle between the display screen 10 and the optical mirror 20 is γ.

The wearable apparatus can include one or more cameras. The display screen may be electrically coupled with the one or more cameras, and may display contents that match the images captured by the one or more cameras. In some embodiments, the wearable apparatus can further include a processor. The one or more cameras may capture the user's gesture and the processor may execute an operation corresponding to the captured gesture. The one or more cameras may capture a current real scene. The processor may generate related information to match the current real scene captured by the one or more cameras, and control the display screen to display the contents related to the current real scene. In some embodiments, the wearable apparatus can be used in connection with an unmanned aerial vehicle (UAV). When a user wearing the wearable apparatus is operating the UAV, the user can observe the actual flying status of the UAV within the range of sight and at the same time see the flying related information such as text, image, and/or video content. For example, information such as flying status, flying direction, flying trajectory, obstacle information, operation instruction, and video and image in the first-person view may be visually displayed by the wearable apparatus. There can be more application scenarios than those listed here.

In these embodiments, the working principle, implementation method, and connection of the wearable apparatus in the UAV system may be the same as or similar to those in some of the embodiments described above, which are not described here.

The wearable apparatus in the UAV system consistent with the disclosure may adjust the quantity of the external light transmitting through the optical mirror by the adjusting device. The virtual reality mode may be switched on when the passing quantity of the external light equals zero, and the augmented reality may be switched on when the external light is allowed to be incident onto the optical mirror. Thus, by means of the adjusting device, the wearable apparatus can integrate virtual reality and augmented reality into one system, and can also switch between the virtual reality and the augmented reality.

In some embodiments, the adjusting device further may include a shading member 40, which faces the other surface of the optical mirror that is opposite to the reflective surface. The shading member 40 may be used to block the external light from being incident onto the optical mirror.

In these embodiments, the working principle, implementation method, and connection of the wearable apparatus in the UAV system may be the same as or similar to those in some of the embodiments described above, which are not described here.

Consistent with the disclosure, if the shading member 40 blocks the external light, the user will not see the real-world scene and thus can immerse in the virtual scene under the virtual reality mode. The structures of the housing body 50 and the shading member 40 may not be limited to those described above. Persons skilled in the art may devise different feasible structures according to actual needs, which may not be described here.

In some embodiments, the shading member 40 may have a variable light transmittance and may be electrically coupled with the adjusting device (not shown). The adjusting device may be used to adjust a voltage applied to the shading member 40 for changing the light transmittance of the shading member 40.

In these embodiments, the working principle, implementation method, and connection of the wearable apparatus in the UAV system may be the same as or similar to those in some of the embodiments described above, which are not described here.

The wearable apparatus consistent with the disclosure may operate in both the virtual reality mode and the augmented reality mode. The light transmittance of the shading member 40 can be adjusted to control whether the external light can enter the wearable apparatus. In some embodiments, the shading member 40 can be completely opaque if the voltage of a predetermined value is applied to the shading member 40 or if no voltage is applied to the shading member 40, and the wearable apparatus can operate in the virtual reality mode. On the other hand, the shading member 40 can be transparent if the voltage of another predetermined value is applied to the shading member 40, allowing the external light to enter the wearable apparatus and the user to see the exterior real-world scene, and the wearable apparatus can operate in the augmented reality mode.

In some embodiments, the shading member 40 may be configured to be detachable from the housing body 50 of the wearable apparatus.

In these embodiments, the working principle, implementation method, and connection of the wearable apparatus in the UAV system may be the same as or similar to those in some of the embodiments described above, which are not described here.

In some embodiments, an opening may be provided on the housing body 50 in the front of the user's sight. The shading member 40 may be detachably configured at the opening. In some embodiments, the shading member 40 may include a main body and a supporting component (not shown) for ensuring the integrity of the entire apparatus. The supporting component may comprise a transparent glass plate or another transparent material. The supporting component and the main body of the shading member 40 may be arranged in a stacked manner. The supporting component may be secured to the housing body 50 of the wearable apparatus, forming a side wall of the housing body 50. When the external light needs to be blocked, the main body of the shading member 40 can be placed on the inside of the housing body 50 of the wearable apparatus and arranged in a stack with the supporting component. When the external light needs to be allowed to pass, the main body of the shading member 40 can be removed from the housing body 50 of the wearable apparatus. As such, a pleasant appearance and a proper protection of the internal parts of the wearable apparatus can be ensured.

The wearable apparatus in the UAV system consistent with the disclosure can have a simpler structure and a lower cost, and can also switch between the virtual reality mode and the augmented reality mode by installing or removing the detachable shading member 40.

Referring to FIG. 1 to FIG. 5, in some embodiments, the wearable apparatus further includes the first eyepiece 30*a* and the second eyepiece 30*b*. The first eyepiece 30*a* and the second eyepiece 30*b* may be configured between the display plane of the display screen and the reflective surface of the optical mirror.

Because different users have different interpupillary distances, the wearable apparatus can accommodate different users by adjusting the interpupillary distance.

In these embodiments, the working principle, implementation method, and connection of the wearable apparatus in the UAV system may be the same as or similar to those in some of the embodiments described above, which are not described here.

The wearable apparatus in the UAV system consistent with the disclosure can enhance the sense of immersion and the display quality via the first eyepiece 30*a* and the second eyepiece 30*b*.

In some embodiments, the wearable apparatus in the UAV system may further include an interpupillary distance adjustment system, which may be coupled to the first eyepiece 30*a* and the second eyepiece 30*b*. The interpupillary distance adjustment system may alter the distance between the first eyepiece 30*a* and the second eyepiece 30*b* by driving the first eyepiece 30*a* and/or the second eyepiece 30*b* to move towards or away from each other. Because different users may have different interpupillary distances, the wearable apparatus with the interpupillary distance adjustment system can accommodate different users.

In these embodiments, the working principle, implementation method, and connection of the wearable apparatus in the UAV system may be the same as or similar to those in some of the embodiments described above, which are not described here.

The wearable apparatus in the UAV system consistent with the disclosure can accommodate different users by adjusting the distance between the first eyepiece 30*a* and the second eyepiece 30*b* via the interpupillary distance adjustment system.

FIG. 7 is a schematic block diagram of an example interpupillary distance adjustment system consistent with the disclosure. As shown in FIG. 7, the interpupillary distance adjustment system includes a servo motor controller 60, a servo motor 70, and a transmission device 80. The servo motor controller 60 may be used to control the rotation angle of the output shaft of the servo motor 70. The transmission device 80 may be used to convert the rotational motion into a linear motion. The servo motor 70 may be connected to an input terminal of the transmission device 80. An output terminal of the transmission device 80 may be connected to the first eyepiece 30*a* and the second eyepiece 30*b*.

In some embodiments, when the interpupillary distance is being adjusted, the images on the first display screen 10*a* and the second display screen 10*b* may be synchronously translated according to the distance between the first eyepiece 30*a* and the second eyepiece 30*b*, thus allowing the center of each of the user's eyes, the center of the corresponding eyepiece, and the center of the corresponding image to align in a line. As a result, the viewing comfort can be enhanced.

In these embodiments, the working principle, implementation method, and connection of the wearable apparatus in the UAV system may be the same as or similar to those in some of the embodiments described above, which are not described here.

The wearable apparatus in the UAV system consistent with the disclosure can accurately adjust the interpupillary distance and thus can offer a better comfort of use.

In some embodiments, the UAV system may include one or more cameras that can capture the images in the first-person view (not shown) and can communicate with the wearable apparatus. Referring to FIG. 1 and FIG. 2, the wearable apparatus includes a first display screen 10*a*, a second display screen 10*b*, a first optical mirror 20*a*, a second optical mirror 20*b*, a shading member 40, and an adjusting device.

Two reflective surfaces 21*a* and 21*b* are formed on the first optical mirror 20*a* and the second optical mirror 20*b*, respectively. A first predetermined angle α is formed between the reflective surface 21*a* of the first optical mirror 20*a* and the first display screen 10*a*. A second predetermined angle, β, is formed between the display plane 11*b* of the second display screen 10*b* and the reflective surface 21*b* of the second optical mirror 20*b*. Each of the first optical mirror 20*a* and the second optical mirror 20*b* may be partially transmissive and partially reflective. The adjusting device can be used to adjust the quantity of the external light transmitting through the shading member 40 into the wearable apparatus. In some embodiments, each of the first optical mirror 20*a* and the second optical mirror 20*b* can be a semi-transmissive/semi-reflective mirror.

The wearable apparatus can include one or more cameras. The first display screen 10*a* and the second display screen 10*b* may be electrically coupled with the one or more cameras, and may display contents that match the images captured by the one or more cameras. In some embodiments, the wearable apparatus can further include a processor. The one or more cameras may capture the user's gesture and the processor may execute an operation corresponding to the captured gesture. The one or more cameras may capture a current real scene. The processor may generate related information to match the current real scene captured by the one or more cameras, and control the first display screen 10*a* and the second display screen 10*b* to display the contents related to the current real scene. In some embodiments, the wearable apparatus can be used in connection with an unmanned aerial vehicle (UAV). When a user wearing the wearable apparatus is operating the UAV, the user can observe the actual flying status of the UAV within the range of sight and at the same time see the flying related information such as text, image, and/or video content. For example, information such as flying status, flying direction, flying trajectory, obstacle information, operation instruction, and video and image in the first-person view may be visually displayed by the wearable apparatus. There can be more application scenarios than those listed here.

In these embodiments, the working principle, implementation method, and connection of the wearable apparatus in the UAV system may be the same as or similar to those in some of the embodiments described above, which are not described here.

The wearable apparatus in the UAV system can be, e.g., eyeglasses or a helmet, which is not limited in the present disclosure. Consistent with the disclosure, the wearable apparatus may display contents using two display screens (the first display screen 10*a* and the second display screen 10*b*), and may project the displayed contents into the user's left and right eyes via the first optical mirror 20*a* and the second optical mirror 20*b*. Each of the first optical mirror 20a and the second optical mirror 20b may be partially transmissive and partially reflective. The adjusting device can be used to adjust the quantity of the external light transmitting through the first optical mirror 20a and the second optical mirror 20b. Thus, the adjusting device can allow both virtual reality and augmented reality to be integrated in the wearable apparatus, and thus the wearable apparatus can also switch between the virtual reality mode and the augmented reality mode.

In some embodiments, the adjusting device further includes a shading member 40, which faces the other surface of the first optical mirror 20a that is opposite to the reflective surface 21a and the other surface of the second optical mirror 20b that is opposite to the reflective surface 21b. The shading member 40 may be used to block the external light from being incident onto the first optical mirror 20a and the second optical mirror 20b.

The wearable apparatus further includes a housing body 50, which can, for example, have a boxlike structure, as shown in FIG. 1. The shading member 40 may have a thin plate structure or another structure. The external light needs to first passes through the shading member 40 before being incident onto the other surface of the first optical mirror 20a that is opposite to the reflective surface 21a and onto the other surface of the second optical mirror 20b that is opposite to the reflective surface 21b. Hence, when the external light is blocked by the shading member 40, the user cannot see the real-world scene and thus may immerse in the virtual scene under the virtual reality mode. The structures of the housing body 50 and the shading member 40 are not limited to those described above. Persons skilled in the art may devise different feasible structures according to actual needs, which are not described here.

When the external light is blocked by the shading member 40, the user—wearing the wearable apparatus of the UAV system consistent with the disclosure—cannot see the real-world scene and thus may immerse in the virtual scene under the virtual reality mode. The structures of the housing body 50 and the shading member 40 are not limited to those described above. Persons skilled in the art may devise different feasible structures according to actual needs, which are not described here. In some embodiments, the shading member 40 can control the quantity of the external light being incident onto the first optical mirror 20a and the second optical mirror 20b, and thus can switch between the virtual reality mode and the augmented reality mode.

In some embodiments, the shading member 40 may have a variable light transmittance and may be electrically coupled with the adjusting device (not shown). The adjusting device may be used to adjust a voltage applied to the shading member 40 for changing the light transmittance of the shading member 40.

In these embodiments, the working principle, implementation method, and connection of the wearable apparatus in the UAV system may be the same as or similar to those in some of the embodiments described above, which are not described here.

In some embodiments, the shading member 40 can be arranged perpendicular to the first display screen 10a and the second display screen 10b for a good shading performance.

According to some embodiments of the disclosure, the wearable apparatus in the UAV system may operate in both the virtual reality mode and the augmented reality mode. The light transmittance of the shading member 40 can be adjusted to control whether the external light can enter the wearable apparatus. In some embodiments, the shading member 40 can be completely opaque if the voltage of a predetermined value is applied to the shading member 40 or if no voltage is applied to the shading member 40, and the wearable apparatus can operate in the virtual reality mode. On the other hand, the shading member 40 can be transparent if the voltage of another predetermined value is applied to the shading member 40, allowing the external light to enter the wearable apparatus and the user to see the exterior real-world scene, and the wearable apparatus can operate in the augmented reality mode.

In some embodiments, the shading member 40 may be configured to be detachable from the housing body 50 of the wearable apparatus. In these embodiments, the shading member 40 may include a common opaque material, such as a plastic plate or a wood board. In some embodiments, the weight of the shading member 40 may be light, such that the total weight of the entire wearable apparatus can be reduced and the comfort to wear the wearable apparatus can be enhanced.

The shading member 40 may be attached to the housing body 50 of the wearable apparatus by snapping, docking, threading etc. Various manners of connection can be employed, and the present disclosure is not limited to those described above.

The shading member 40 may be attached from the housing body 50 of the wearable apparatus by snapping, docking, threading, etc. Various manners of connection can be employed, and the present disclosure is not limited to those described above.

The wearable apparatus including the detachable shading member 40 may have a simpler structure and a lower cost, and may also adjust the quantity of the external light incident into the inside of the wearable apparatus. In some embodiments, an opening may be provided on the housing body 50 in the front of the user's sight. The shading member 40 may be detachably configured at the opening. In some embodiments, the shading member 40 may include a main body and a supporting component (not shown) for ensuring the integrity of the entire apparatus. The supporting component may comprise a transparent glass plate or another transparent material. The supporting component and the main body of the shading member 40 may be arranged in a stacked manner. The supporting component may be secured to the housing body 50 of the wearable apparatus, forming a side wall of the housing body 50. When the external light needs to be blocked, the main body of the shading member 40 can be placed on the inside of the housing body 50 of the wearable apparatus and arranged in a stack with the supporting component. When the external light needs to be allowed to pass, the main body of the shading member 40 can be removed from the housing body 50 of the wearable apparatus. As such, a pleasant appearance and a proper protection of the internal parts of the wearable apparatus can be ensured.

In some embodiments, the first eyepiece 30a may be configured between the first display screen 10a and the first optical mirror 20a. The second eyepiece 30b may be configured between the second display screen 20b and the second optical mirror 20b. Each of the first eyepiece 30a and the second eyepiece 30b may include a lens set including at least one convex lens and at least one concave lens. The object image 101a projected by the first display screen 10a via the first optical mirror 20a may be perpendicular to the optical axis of the first eyepiece 30a. The object image projected by the second display screen 10b on the second optical mirror 20b may be perpendicular to the optical axis of the second eyepiece 30b.

In these embodiments, the working principle, implementation method, and connection of the wearable apparatus in the UAV system may be the same as or similar to those in some of the embodiments described above, which are not described here.

The wearable apparatus in the UAV system can be, e.g., eyeglasses or a helmet, which is not limited in the present disclosure. Consistent with the disclosure, the wearable apparatus may display contents using two display screens (the first display screen 10a and the second display screen 10b), and may project the displayed contents into the user's left and right eyes via the first optical mirror 20a and the second optical mirror 20b. Each of the first optical mirror 20a and the second optical mirror 20b may be partially transmissive and partially reflective. The adjusting device can be used to adjust the quantity of the external light transmitting through the first optical mirror 20a and the second optical mirror 20b. Thus, the adjusting device allows both virtual reality and augmented reality to be integrated in the wearable apparatus, and thus the wearable apparatus can also switch between the virtual reality mode and the augmented reality mode. Compared to the existing technology, the effective monocular visual field consistent with the disclosure can reach 5.5 inches, with a resolution of 2560× 1440. The field of view can reach approximately 45° without eyepieces disposed in the wearable apparatus. If eyepieces with a 1.5-time magnification are added, the field of view can further reach 70°. Therefore, a strong sense of immersion can be provided. Due to the increased effective monocular visual field, the magnification of the eyepieces does not have to be very high to achieve a good sense of immersion. Therefore, the grain effect experienced by the user can be reduced, and the display quality can be more delicate. For a helmet, an even better display quality can be obtained by utilizing display screens of a larger size and a higher resolution.

In some embodiments, the first display screen 10a and the second display screen 10b may be arranged to face each other and be parallel to each other. For example, as shown in FIG. 1 and FIG. 2, a predetermined distance is formed between the first display screen 10a and the second display screen 10b. The first optical mirror 20a, the second optical mirror 20b, the first eyepiece 30a and the second eyepiece 30b are positioned between the first display screen 10a and the second display screen 10b. The relative position between the first display screen 10a and the second display screen 10b may be determined according to the width of user's face or head, such that when the wearable apparatus is in use the first display screen 10a and the second display screen 10b may be positioned approximately parallel to each other and on the two sides of the user's eyes, respectively. Therefore, a more pleasurable viewing experience may be provided to the user, and in the more space may be saved to ensure that the entire structure of the wearable apparatus is compact.

In some embodiments, the first display screen 10a and the second display screen 10b of the wearable apparatus may be placed closely against each other. In other words, the display plane 11a of the first display screen 10a and the display plane 11b of the second display screen 10b may face away from each other. Consequently, the reflective surface 21a of the first optical mirror 20a may face the display plane 11a of the first display screen 10a, and the reflective surface 21b of the second optical mirror 20b faces the display plane 11b of the second display screen 10b. In this manner, the first display screen 10a and the second display screen 10b may be disposed in the middle between the user's two eyes. When the wearable apparatus is being worn by the user, the first display screen 10a and the second display screen 10b can be mounted in front of the user's nose bridge. Each of the first display screen 10a and the second display screen 10b may include an ultra-thin display screen to prevent the user's sight from being blocked, thereby ensuring a comfortable viewing experience.

Referring again to FIG. 2, the first predetermined angle $\alpha$ may be equal to the second predetermined angle $\beta$. Because the optical axis of the first eyepiece 30a may be nearly parallel to the optical axis of the second eyepiece 30b, the first display screen 10a may also be nearly parallel to the second display screen 10b, the first predetermined angle $\alpha$ may be approximately equal to the second predetermined angle $\beta$, and the first optical mirror 20a and the second optical mirror 20b may be arranged symmetrically with respect to the symmetry axis between the first eyepiece 30a and the second eyepiece 30b. Hence, the first optical mirror 20a and the second optical mirror 20b may roughly form the two legs (sides of equal lengths) of an isosceles triangle.

In some embodiments, each of the first predetermined angle $\alpha$ and the second predetermined angle $\beta$ may be 45°, thus allowing the object image projected by the first display screen 10a via the first optical mirror 20a to be perpendicular to the optical axis of the first eyepiece 30a, and allowing the object image projected by the second display screen 10b via the second optical mirror 20b to be perpendicular to the optical axis of the second eyepiece 30b. Those skilled in the art would understand that in the practical design of the wearable apparatus, the predetermined angle $\alpha$ and the second predetermined angle $\beta$ may vary within an allowable range of the error criterion. For example, the allowable range of the first predetermined angle $\alpha$ and the second predetermined angle $\beta$ may be 45°±5°. When the first predetermined angle $\alpha$ and the second predetermined angle $\beta$ are set as approximately 45°, the object images projected by the first display screen 10a and the second display screen 10b via the first optical mirror 20a and the second optical mirror 20b may be approximately perpendicular to the optical axes of the first eyepiece 30a and the second eyepiece 30b, respectively. Thus, the user can see the object images right in front. The user experience can be better.

In some embodiments, the wearable apparatus in the UAV system may further include an interpupillary distance adjustment system, which may be coupled to the first eyepiece 30a and the second eyepiece 30b. The interpupillary distance adjustment system may alter the distance between the first eyepiece 30a and the second eyepiece 30b by driving the first eyepiece 30a and/or the second eyepiece 30b to move towards or away from each other. Because different users may have different interpupillary distances, the wearable apparatus with the interpupillary distance adjustment system can accommodate different users.

In these embodiments, the working principle, implementation method, and connection of the wearable apparatus in the UAV system may be the same as or similar to those in some of the embodiments described above, which are not described here.

The wearable apparatus in the UAV system consistent with the disclosure can accommodate different users by adjusting the distance between the first eyepiece 30a and the second eyepiece 30b via the interpupillary distance adjustment system.

FIG. 7 is a schematic block diagram of an example interpupillary distance adjustment system consistent with the disclosure. As shown in FIG. 7, the interpupillary distance adjustment system includes a servo motor controller 60, a servo motor 70, and a transmission device 80. The servo motor controller 60 may be used to control the rotation angle of the output shaft of the servo motor 70. The transmission device 80 may be used to convert the rotational motion into a linear motion. The servo motor 70 may be connected to an input terminal of the transmission device 80. An output terminal of the transmission device 80 may be connected to the first eyepiece 30a and the second eyepiece 30b.

In some embodiments, when the interpupillary distance is being adjusted, the images on the first display screen 10a and the second display screen 10b may be synchronously translated according to the distance between the first eyepiece 30a and the second eyepiece 30b, thus allowing the center of each of the user's eyes, the center of the corresponding eyepiece, and the center of the corresponding image to align in a line. As a result, the viewing comfort can be enhanced.

In these embodiments, the working principle, implementation method, and connection of the wearable apparatus in the UAV system may be the same as or similar to those in some of the embodiments described above, which are not described here.

The wearable apparatus in the UAV system consistent with the disclosure can accurately adjust the interpupillary distance and thus can offer a better comfort of use.

In some embodiments, the UAV system may include one or more cameras that can capture the images in the first-person view (not shown) and can communicate with the wearable apparatus. Referring to FIG. 4 or FIG. 5, the wearable apparatus consistent with the disclosure may include the display screen 10, the optical mirror 20, the shading member 40 and the adjusting device. The number of each of the display screen 10 and the optical mirror 20 may be one. A reflective surface 21 may be formed on the optical mirror 20. A predetermined angle, γ, may be formed between the display plane 11 of the display screen 10 and the reflective surface 21 of the optical mirror 20. The optical mirror 20 may be semi-transmissive/semi-reflective. The adjusting device may be used to control the quantity of the external light transmitting through the shading member 40 and entering into the wearable apparatus. In these embodiments, the optical mirror 20 may be a semi-transmissive/semi-reflective mirror.

The wearable apparatus can include one or more cameras. The display screen 10 may be electrically coupled with the one or more cameras, and may display contents that match the images captured by the one or more cameras. In some embodiments, the wearable apparatus can further include a processor. The one or more cameras may capture the user's gesture and the processor may execute an operation corresponding to the captured gesture. The one or more cameras may capture a current real scene. The processor may generate related information to match the current real scene captured by the one or more cameras, and control the display screen 10 to display the contents related to the current real scene. In some embodiments, the wearable apparatus can be used in connection with an unmanned aerial vehicle (UAV). When a user wearing the wearable apparatus is operating the UAV, the user can observe the actual flying status of the UAV within the range of sight and at the same time see the flying related information such as text, image, and/or video content. For example, information such as flying status, flying direction, flying trajectory, obstacle information, operation instruction, and video and image in the first-person view may be visually displayed by the wearable apparatus. There can be more application scenarios than those listed here.

In these embodiments, the working principle, implementation method, and connection of the wearable apparatus in the UAV system may be the same as or similar to those in some of the embodiments described above, which are not described here.

The wearable apparatus in the UAV system can be, e.g., eyeglasses or a helmet, which is not limited in the present disclosure. Consistent with the disclosure, the wearable apparatus may display contents using a single display screen 10, and therefore may have a simpler structure and a smaller size in volume. The contents on the display screen 10 may be projected into the user's left and right eyes via the optical mirror 20. The optical mirror 20 may be partially transmissive and partially reflective. The adjusting device can be used to adjust the quantity of the external light transmitting through the shading member 40 into the wearable apparatus. Thus, the adjusting device can allow both virtual reality and augmented reality to be integrated in the wearable apparatus, and thus the wearable apparatus can also switch between the virtual reality mode and the augmented reality mode.

In some embodiments, the shading member 40 may face the other surface of the optical mirror 20 that is opposite to the reflective surface 21. The shading member 40 may be used to inhibit the external light of the exterior real-world scene from being incident onto the optical mirror 20.

In these embodiments, the working principle, implementation method, and connection of the wearable apparatus in the UAV system may be the same as or similar to those in some of the embodiments described above, which are not described here.

The wearable apparatus in the UAV system consistent with the disclosure can control the quantity of the external light being incident onto the optical mirror 20 via the shading member 40, and thus can switch between the virtual reality mode and the augmented reality mode.

In some embodiments, the shading member 40 may have a variable light transmittance and may be electrically coupled with the adjusting device (not shown). The adjusting device may be used to adjust a voltage applied to the shading member 40 for changing the light transmittance of the shading member 40.

In some embodiments, the angle between the shading member 40 and the display screen 10 may be set to be approximately equal to the predetermined angle between the display screen 10 and the optical mirror 20 for a good shading performance.

In these embodiments, the working principle, implementation method, and connection of the wearable apparatus in the UAV system may be the same as or similar to those in some of the embodiments described above, which are not described here.

The wearable apparatus in the UAV system consistent with the disclosure may operate in both the virtual reality mode and the augmented reality mode. The light transmittance of the shading member 40 can be adjusted to control whether the external light can enter the wearable apparatus. In some embodiments, the shading member 40 can be completely opaque if the voltage of a predetermined value is applied to the shading member 40 or if no voltage is applied to the shading member 40, and the wearable apparatus can operate in the virtual reality mode. On the other hand, the shading member 40 can be transparent if the voltage of another predetermined value is applied to the shading member 40, allowing the external light to enter the wearable apparatus and the user to see the exterior real-world scene, and the wearable apparatus can operate in the augmented reality mode.

In some embodiments, the shading member 40 may be configured to be detachable from the housing body 50 of the wearable apparatus.

In these embodiments, the working principle, implementation method, and connection of the wearable apparatus in the UAV system may be the same as or similar to those in some of the embodiments described above, which are not described here.

In some embodiments, an opening may be provided on the housing body 50 in the front of the user's sight. The shading member 40 may be detachably configured at the opening. In some embodiments, the shading member 40 may include a main body and a supporting component (not shown) for ensuring the integrity of the entire apparatus. The supporting component may comprise a transparent glass plate or another transparent material. The supporting component and the main body of the shading member 40 may be arranged in a stacked manner. The supporting component may be secured to the housing body 50 of the wearable apparatus, forming a side wall of the housing body 50. When the external light needs to be blocked, the main body of the shading member 40 can be placed on the inside of the housing body 50 of the wearable apparatus and arranged in a stack with the supporting component. When the external light needs to be allowed to pass, the main body of the shading member 40 can be removed from the housing body 50 of the wearable apparatus. As such, a pleasant appearance and a proper protection of the internal parts of the wearable apparatus can be ensured.

The wearable apparatus in the UAV system consistent with the disclosure can have a simpler structure and a lower cost, and can also switch between the virtual reality mode and the augmented reality mode by installing or removing the detachable shading member 40.

In some embodiments, the wearable apparatus may further include a first eyepiece 30*a* and a second eyepiece 30*b*. The first eyepiece 30*a* and the second eyepiece 30*b* may be configured between the display plane 11 of the display screen 10 and the reflective surface 21 of the optical mirror 20. Each of the first eyepiece 30*a* and the second eyepiece 30*b* may include a lens set, including at least one convex lens and at least one concave lens.

Persons skilled in the art would understand that in an optical system, the eyepiece is generally an optical element for magnifying an image produced by an objective lens. Thus, the images viewed by a user through the first eyepiece 30*a* and the second eyepiece 30*b* may be magnified. In some embodiments, both the first eyepiece 30*a* and the second eyepiece 30*b* may include a lens set including at least one convex lens and at least one concave lens. The convex lens may further magnify the image, widen the field of view, and enhance the sense of immersion. The concave lens may limit the field of view and allow a certain range of light to pass through the lens set.

When using the wearable apparatus, the user can look through the first eyepiece 30*a* with the user's left eye, and can look through the second eyepiece 30*b* with the user's right eye. An angle may be formed between the display plane 11 of the display screen 10 and the optical axis of the first eyepiece 30*a*. The object image projected by the display screen 10 via the optical mirror 20 may be approximately perpendicular to the optical axes of the first eyepiece 30*a* and the second eyepiece 30*b*. As a result, the distances between various points on the object image and the eyepiece may be the same, thereby preventing the object images from deforming into trapezium to deteriorate viewing effect. The predetermined angle γ between the display screen 10 and the optical mirror 20 may determine whether the object image formed by reflection of the display screen 10 via the optical mirror 20 can be approximately perpendicular to the optical axes of the first eyepiece 30*a* and the second eyepiece 30*b*.

In some embodiments, the first eyepiece 30*a* and the second eyepiece 30*b* each may include a lens set including at least one convex lens and at least one concave lens. Thus, the object images, formed by reflection of the contents on the display screen 10 via the optical mirror 20, may be virtual images.

In some embodiments, the wearable apparatus in the UAV system may further include an interpupillary distance adjustment system, which may be coupled to the first eyepiece 30*a* and the second eyepiece 30*b*. The interpupillary distance adjustment system may alter the distance between the first eyepiece 30*a* and the second eyepiece 30*b* by driving the first eyepiece 30*a* and/or the second eyepiece 30*b* to move towards or away from each other. Because different users may have different interpupillary distances, the wearable apparatus with the interpupillary distance adjustment system can accommodate different users.

In these embodiments, the working principle, implementation method, and connection of the wearable apparatus in the UAV system may be the same as or similar to those in some of the embodiments described above, which are not described here.

The wearable apparatus in the UAV system consistent with the disclosure can accommodate different users by adjusting the distance between the first eyepiece 30*a* and the second eyepiece 30*b* via the interpupillary distance adjustment system.

FIG. 7 is a schematic block diagram of an example interpupillary distance adjustment system consistent with the disclosure. As shown in FIG. 7, the interpupillary distance adjustment system includes a servo motor controller 60, a servo motor 70, and a transmission device 80. The servo motor controller 60 may be used to control the rotation angle of the output shaft of the servo motor 70. The transmission device 80 may be used to convert the rotational motion into a linear motion. The servo motor 70 may be connected to an input terminal of the transmission device 80. An output terminal of the transmission device 80 may be connected to the first eyepiece 30*a* and the second eyepiece 30*b*.

In some embodiments, when the interpupillary distance is being adjusted, the images on the display screen 10 may be synchronously translated according to the distance between the first eyepiece 30*a* and the second eyepiece 30*b*, thus allowing the center of each of the user's eyes, the center of the corresponding eyepiece, and the center of the corresponding image to align in a line. As a result, the viewing comfort can be enhanced.

In these embodiments, the working principle, implementation method, and connection of the wearable apparatus in the UAV system may be the same as or similar to those in some of the embodiments described above, which are not described here.

The wearable apparatus in the UAV system consistent with the disclosure can accurately adjust the interpupillary distance and thus can offer a better comfort of use.

In some embodiments, the UAV system may include one or more cameras that can capture the images in the first-person view (not shown) and can communicate with the wearable apparatus. FIG. 6 is a schematic structural diagram of a wearable apparatus according to another embodiment. As shown in FIG. 6, the wearable apparatus in the UAV system consistent with the disclosure includes a display screen 10, a first eyepiece 30a, a second eyepiece 30b, a shading member 40 and an adjusting device. In some embodiments, the display screen 10 may be perpendicular to the optical axes of the first eyepiece 30a and the second eyepiece 30b. The display screen 10 may be light transmissive. The adjusting device may be used to adjust the quantity of the external light transmitting through the shading member 40 and into the wearable apparatus.

In these embodiments, the working principle, implementation method, and connection of the wearable apparatus in the UAV system may be the same as or similar to those in some of the embodiments described above, which are not described here.

In some embodiments, the wearable apparatus in the UAV system may include the light-transmissive display screen 10 that can be placed right in the front of the user. As such, the user can see both the contents on the display screen 10 and the exterior real-world scene, thereby experiencing the augmented reality mode. In some other embodiments, the adjusting device may adjust the quantity of the external light transmitting through the display screen 10 to control whether the external light can enter into the user's eyes via the display screen 10. For example, when the adjusting device completely blocks the external light from entering into the user's eyes, the wearable apparatus works in the virtual reality mode. According to some embodiments of the disclosure, the wearable apparatus can integrate both virtual reality and augmented reality into one system, and may also switch between the virtual reality mode and the augmented reality mode. Hence, the user wearing the wearable apparatus can have a good flexibility to experience different viewing effects in the virtual reality mode and the augmented reality mode, when observing the flying status of the UAV.

In some embodiments, the shading member 40 may be further set to be parallel to the display screen 10. The shading member 40 may have a thin plate structure or another structure. The shading member 40 can be used to block the external light of the real-world scene from entering into display screen 10. The external light needs to first transmit through the display screen 10 before reaching the user's eyes. If the shading member 40 blocks the external light, the user will not see the real-world scene and thus can immerse in the virtual scene under the virtual reality mode. The structures of the housing body 50 and the shading member 40 may not be limited to those described above. Persons skilled in the art may devise different feasible structures according to actual needs, which may not be described here.

In some embodiments, the shading member 40 may have a variable light transmittance and may be electrically coupled with the adjusting device (not shown). The adjusting device may be used to adjust a voltage applied to the shading member 40 for changing the light transmittance of the shading member 40.

In these embodiments, the working principle, implementation method, and connection of the wearable apparatus in the UAV system may be the same as or similar to those in some of the embodiments described above, which are not described here.

The wearable apparatus in the UAV system consistent with the disclosure may operate in both the virtual reality mode and the augmented reality mode. The light transmittance of the shading member 40 can be adjusted to control whether the external light can enter the wearable apparatus. In some embodiments, the shading member 40 can be completely opaque if the voltage of a predetermined value is applied to the shading member 40 or if no voltage is applied to the shading member 40, and the wearable apparatus can operate in the virtual reality mode. On the other hand, the shading member 40 can be transparent if the voltage of another predetermined value is applied to the shading member 40, allowing the external light to enter the wearable apparatus and the user to see the exterior real-world scene, and the wearable apparatus can operate in the augmented reality mode.

In some embodiments, the shading member 40 may be configured to be detachable from the housing body 50 of the wearable apparatus. In these embodiments, the working principle, implementation method and connection of the wearable apparatus in the UAV system may be the same as those described in some embodiments above, which are not described here.

In some embodiments, an opening may be provided on the housing body 50 in the front of the user's sight. The shading member 40 may be detachably configured at the opening. In some embodiments, the shading member 40 may include a main body and a supporting component (not shown) for ensuring the integrity of the entire apparatus. The supporting component may comprise a transparent glass plate or another transparent material. The supporting component and the main body of the shading member 40 may be arranged in a stacked manner. The supporting component may be secured to the housing body 50 of the wearable apparatus, forming a side wall of the housing body 50. When the external light needs to be blocked, the main body of the shading member 40 can be placed on the inside of the housing body 50 of the wearable apparatus and arranged in a stack with the supporting component. When the external light needs to be allowed to pass, the main body of the shading member 40 can be removed from the housing body 50 of the wearable apparatus. As such, a pleasant appearance and a proper protection of the internal parts of the wearable apparatus can be ensured.

The wearable apparatus in the UAV system consistent with the disclosure can have a simpler structure and a lower cost, and can also switch between the virtual reality mode and the augmented reality mode by installing or removing the detachable shading member 40.

In some embodiments, the wearable apparatus in the UAV system may further include an interpupillary distance adjustment system, which may be coupled to the first eyepiece 30a and the second eyepiece 30b. The interpupillary distance adjustment system may alter the distance between the first eyepiece 30a and the second eyepiece 30b by driving the first eyepiece 30a and/or the second eyepiece 30b to move towards or away from each other. Because different users may have different interpupillary distances, the wearable apparatus with the interpupillary distance adjustment system can accommodate different users.

In these embodiments, the working principle, implementation method, and connection of the wearable apparatus in the UAV system may be the same as or similar to those in some of the embodiments described above, which are not described here.

The wearable apparatus in the UAV system consistent with the disclosure can accommodate different users by adjusting the distance between the first eyepiece 30a and the second eyepiece 30b via the interpupillary distance adjustment system.

FIG. 7 is a schematic block diagram of an example interpupillary distance adjustment system consistent with the disclosure. As shown in FIG. 7, the interpupillary distance adjustment system includes a servo motor controller 60, a servo motor 70, and a transmission device 80. The servo motor controller 60 may be used to control the rotation angle of the output shaft of the servo motor 70. The transmission device 80 may be used to convert the rotational motion into a linear motion. The servo motor 70 may be connected to an input terminal of the transmission device 80. An output terminal of the transmission device 80 may be connected to the first eyepiece 30a and the second eyepiece 30b.

In some embodiments, when the interpupillary distance is being adjusted, the images on the display screen 10 may be synchronously translated according to the distance between the first eyepiece 30a and the second eyepiece 30b, thus allowing the center of each of the user's eyes, the center of the corresponding eyepiece, and the center of the corresponding image to align in a line. As a result, the viewing comfort can be enhanced.

In these embodiments, the working principle, implementation method, and connection of the wearable apparatus in the UAV system may be the same as or similar to those in some of the embodiments described above, which are not described here.

The wearable apparatus in the UAV system consistent with the disclosure can accurately adjust the interpupillary distance and thus can offer a better comfort of use.

The foregoing is only a description of some embodiments of the present disclosure and is not to limit the scope of the present disclosure. Equivalent structure or equivalent process made using any contents of the present specification and drawings, or use of the present disclosure in other relevant technologies, either directly or indirectly, should be included in the scope of the present disclosure.

The above embodiments are merely provided for describing the technical solutions of the present disclosure, but are not intended to limit the present disclosure. Although the present disclosure has been described in detail with reference to the embodiments, persons skilled in the art will appreciate that the foregoing technical solutions described in the various embodiments can be modified, or some or all of the technical features can be equivalently replaced. Such modifications or replacements do not make the essence of corresponding technical solutions depart from the scope of the present disclosure.

What is claimed is:

1. A wearable apparatus comprising:
   a first display screen having a first display plane;
   a second display screen having a second display plane;
   a first optical mirror comprising a first reflective surface facing the first display screen;
   a second optical mirror comprising a second reflective surface facing the second display screen;
   a first eyepiece arranged between the first display screen and the first optical mirror, an optical axis of the first eyepiece being approximately parallel to the first display plane;
   a second eyepiece arranged between the second display screen and the second optical mirror, an optical axis of the second eyepiece being approximately parallel to the second display plane; and
   a shading member facing another surface of the first optical mirror that is opposite to the first reflective surface and facing another surface of the second optical mirror that is opposite to the second reflective surface, the shading member being configured to block external light from being incident onto the first optical mirror and the second optical mirror,
   wherein:
   the first reflective surface and the first display screen form a first predetermined angle, such that an object image projected by the first display screen through the first optical mirror is approximately perpendicular to the optical axis of the first eyepiece,
   the second reflective surface and the second display screen form a second predetermined angle, such that an object image projected by the second display screen through the second optical mirror is approximately perpendicular to the optical axis of the second eyepiece,
   both the first optical mirror and the second optical mirror are semi-transmissive/semi-reflective, and
   the shading member is detachably coupled to a housing body of the wearable apparatus.

2. The wearable apparatus according to claim 1, wherein the first display screen and the second display screen are arranged parallel to and facing each other.

3. The wearable apparatus according to claim 2, wherein:
   the first display screen and the second display screen are spaced apart from each other; and
   the first optical mirror, the second optical mirror, the first eyepiece, and the second eyepiece are positioned between the first display screen and the second display screen.

4. The wearable apparatus according to claim 1, wherein the first predetermined angle is 45°±5° and the second predetermined angle is 45°±5°.

5. The wearable apparatus according to claim 1, wherein a reflective film or a semi-transmissive/semi-reflective film is coated on each of the first reflective surface and the second reflective surface.

6. The wearable apparatus according to claim 1, wherein each of the first optical mirror and the second optical mirror comprises a semi-transmissive/semi-reflective mirror.

7. The wearable apparatus according to claim 6, wherein a semi-transmissive/semi-reflective film is coated on each of the first reflective surface and the second reflective surface.

8. The wearable apparatus according to claim 1, further comprising:
   an adjusting device configured to adjust a quantity of the external light transmitting through the shading member into the wearable apparatus.

9. The wearable apparatus according to claim 8, wherein:
   the shading member has a variable light transmittance,
   the shading member is electrically coupled with the adjusting device, and
   the adjusting device is configured to adjust a voltage applied to the shading member to adjust the light transmittance of the shading member.

10. The wearable apparatus according to claim 9, wherein the shading member comprises a liquid crystal display.

11. The wearable apparatus according to claim 1, wherein the shading member is approximately perpendicular to the first display screen and the second display screen.

12. The wearable apparatus according to claim 1, wherein each of the first eyepiece and the second eyepiece comprises a lens or a lens set comprising at least one convex lens and at least one concave lens stacking on each other.

13. The wearable apparatus according to claim 1, further comprising:
   an interpupillary distance adjustment system coupled to the first eyepiece and the second eyepiece and configured to drive the first eyepiece and the second eyepiece to move toward or away from each other to alter a distance between the first eyepiece and the second eyepiece.

14. The wearable apparatus according to claim 13, wherein:
the interpupillary distance adjustment system comprises:
a servo motor;
a servo motor controller configured to control a rotation angle of an output shaft of the servo motor; and
a transmission device configured to convert a rotational motion of the output shaft to a linear motion, an input terminal of the transmission device being coupled to the servo moto, and an output terminal of the transmission device being coupled to the first eyepiece and the second eyepiece.

15. The wearable apparatus according to claim 1, further comprising:
a camera electrically coupled to the first display screen and the second display screen; and
a processor,
wherein:
the first display screen and the second display screen display contents matching a scene captured by the camera,
the camera is configured to capture a gesture of a user, and
the processor is configured to execute an operation corresponding to the gesture.

16. A wearable apparatus, wherein comprising:
a first display screen having a first display plane;
a second display screen having a second display plane;
a first optical mirror comprising a first reflective surface facing the first display screen;
a second optical mirror comprising a second reflective surface facing the second display screen;
a first eyepiece arranged between the first display screen and the first optical mirror, an optical axis of the first eyepiece being approximately parallel to the first display plane; and
a second eyepiece arranged between the second display screen and the second optical mirror, an optical axis of the second eyepiece being approximately parallel to the second display plane, wherein:
the first reflective surface and the first display screen form a first predetermined angle, such that an object image projected by the first display screen through the first optical mirror is approximately perpendicular to the optical axis of the first eyepiece,
the second reflective surface and the second display screen form a second predetermined angle, such that an object image projected by the second display screen through the second optical mirror is approximately perpendicular to the optical axis of the second eyepiece,
the first display screen and the second display screen area arranged parallel to and facing each other,
the first display screen and the second display screen are placed against each other,
the first display plane and the second display plane face away from each other,
the first reflective surface faces the first display plane, and
the second reflective surface faces the second display plane.

17. An unmanned aerial vehicle system comprising:
a camera; and
a wearable apparatus coupled in communication with the camera, the wearable apparatus comprising:
a first display screen having a first display plane;
a second display screen having a second display plane;
a first optical mirror comprising a first reflective surface facing the first display screen;
a second optical mirror comprising a second reflective surface facing the second display screen;
a first eyepiece arranged between the first display screen and the first optical mirror, an optical axis of the first eyepiece being approximately parallel to the first display plane;
a second eyepiece arranged between the second display screen and the second optical mirror, an optical axis of the second eyepiece being approximately parallel to the second display plane; and
a shading member facing another surface of the first optical mirror that is opposite to the first reflective surface and facing another surface of the second optical mirror that is opposite to the second reflective surface, the shading member being configured to block external light from being incident onto the first optical mirror and the second optical mirror,
wherein:
the first reflective surface and the first display screen form a first predetermined angle, such that an object image projected by the first display screen through the first optical mirror is approximately perpendicular to the optical axis of the first eyepiece,
the second reflective surface and the second display screen form a second predetermined angle, such that an object image projected by the second display screen through the second optical mirror is approximately perpendicular to the optical axis of the second eyepiece,
both the first optical mirror and the second optical mirror are semi-transmissive/semi-reflective, and
the shading member is detachably coupled to a housing body of the wearable apparatus.

* * * * *